US012196291B2

United States Patent
Irwin et al.

(10) Patent No.: US 12,196,291 B2
(45) Date of Patent: Jan. 14, 2025

(54) VARIABLE ELECTRIC TRANSMISSION SYSTEM AND METHOD

(71) Applicant: GOBLIN CORP LLC, Gainesville, FL (US)

(72) Inventors: Robert Willard Irwin, Gainesville, FL (US); Peter Robert Irwin, Gainesville, FL (US)

(73) Assignee: GOBLIN CORP LLC, Gainesville, FL (US)

( * ) Notice: Subject to any disclaimer, the term of this patent is extended or adjusted under 35 U.S.C. 154(b) by 0 days.

(21) Appl. No.: 18/533,992

(22) Filed: Dec. 8, 2023

(65) Prior Publication Data

US 2024/0102535 A1    Mar. 28, 2024

Related U.S. Application Data

(63) Continuation of application No. PCT/US2022/032844, filed on Jun. 9, 2022.
(Continued)

(51) Int. Cl.
*F16H 1/46* (2006.01)

(52) U.S. Cl.
CPC ....... *F16H 1/46* (2013.01); *F16H 2200/2007* (2013.01); *F16H 2200/2046* (2013.01)

(58) Field of Classification Search
CPC .............. F16H 1/46; F16H 2200/2007; F16H 2200/2046
See application file for complete search history.

(56) References Cited

U.S. PATENT DOCUMENTS 3,216,285 A    11/1965  Nasvytis
3,254,546 A     6/1966  Nasvytis
(Continued)

FOREIGN PATENT DOCUMENTS

DE      1209835 B    1/1966
DE    3743382 A1    7/1989
(Continued)

OTHER PUBLICATIONS

Abu-Jadayil, Wisam M. et al., "Design and Manufacturng of Self Actuating Traction Drives with Solid and Hollow Rollers," Jordan Journal of Mechanical and Industrial Engineering, Sep. 2010 (Accessible Jan. 2010), pp. 467-476, vol. 4, issue 4.
(Continued)

*Primary Examiner* — Jacob S. Scott
*Assistant Examiner* — Farhana Pervin
(74) *Attorney, Agent, or Firm* — Talem IP Law, LLP

(57) ABSTRACT

A planetary gear system for setting a drive ratio of a transmission includes an outer ring gear; a plurality of planetary gears; an inner sun gear; a first rotary input coupled to one of the outer ring gear, the plurality of planetary gears, and the inner sun gear; a second rotary input coupled to another one of the outer ring gear, the plurality of planetary gears, and the inner sun gear; and a rotary output coupled to a remaining one of the outer ring gear, the plurality of planetary gears the inner sun gear. In some cases, the planetary gear system is combined with a second planetary gear system, and the first rotary input of the planetary gear system and the first rotary input of the second planetary gear system are the same, allowing generation of two independent outputs from three inputs.

26 Claims, 14 Drawing Sheets

Related U.S. Application Data

(60) Provisional application No. 63/209,720, filed on Jun. 11, 2021.

(56) References Cited

U.S. PATENT DOCUMENTS

| | | | |
|---|---|---|---|
| 5,117,931 A | 6/1992 | Nishida | |
| 5,126,594 A | 6/1992 | Shaik et al. | |
| 5,470,283 A | 11/1995 | Seidou | |
| 5,904,631 A | 5/1999 | Morisawa et al. | |
| 6,607,461 B2 | 8/2003 | Ohr et al. | |
| 6,641,499 B1 | 11/2003 | Willmot | |
| 7,547,265 B2 | 6/2009 | Showalter | |
| 10,723,224 B2* | 7/2020 | Misu | F16H 3/728 |
| 2008/0169141 A1* | 7/2008 | Suzuki | H02K 7/085 180/65.7 |
| 2010/0160103 A1* | 6/2010 | Holmes | F16H 3/72 475/140 |
| 2010/0262322 A1* | 10/2010 | Yokouchi | B60L 53/14 903/903 |
| 2011/0015021 A1* | 1/2011 | Maguire | B60K 6/445 475/8 |
| 2011/0090090 A1 | 4/2011 | Naruishi et al. | |
| 2012/0035014 A1* | 2/2012 | Moeller | B60K 6/445 475/5 |
| 2012/0065015 A1* | 3/2012 | Tamai | B60K 6/445 475/5 |
| 2017/0137086 A1* | 5/2017 | Yamamoto | F16H 3/66 |
| 2019/0285141 A1 | 9/2019 | Ohr et al. | |
| 2022/0204131 A1* | 6/2022 | Vianello | B62M 6/50 |
| 2022/0212752 A1* | 7/2022 | Hunter | B62K 1/00 |
| 2022/0219778 A1* | 7/2022 | Corbett | B60L 15/2009 |
| 2022/0227455 A1* | 7/2022 | Corbett | B60W 50/0098 |
| 2022/0250462 A1* | 8/2022 | Bayoux | B60K 6/44 |

FOREIGN PATENT DOCUMENTS

| | | |
|---|---|---|
| DE | 4102202 A1 | 8/1991 |
| DE | 102019210779 A1 | 1/2021 |
| EP | 1160117 A2 | 12/2001 |
| EP | 2306048 A2 | 4/2011 |
| EP | 3395663 A1 | 10/2018 |
| EP | 2271858 B1 | 4/2020 |
| EP | 2295831 B1 | 4/2020 |
| GB | 881313 A | 11/1961 |
| JP | 3717878 B2 | 11/2005 |
| WO | 9906738 A1 | 2/1999 |
| WO | 02081094 A1 | 10/2002 |
| WO | 2004029480 A1 | 4/2004 |
| WO | 2009129966 A2 | 10/2009 |

OTHER PUBLICATIONS

Bagci, Cemil, "Efficient Methods for the Synthesis of Compound Planetary Differential Gear Trains for Multiple Speed Ratio Generation," Gear Technology, Jul./Aug. 1990, pp. 14-35.

Ai, Xiaolan et al., "Development of Friction Drive Transmission" (Abstract), Proceedings of WTC2005 World Tribology Congress III, Sep. 12, 2005, 2 pages, ASME.

Robert Bosch Gmbh., "eAxle," Bosch Mobility Solutions, 2017, Retrieved: Nov. 11, 2020, Retrieved from: https://www.bosch-mobility-solutions.com/en/products-and-services/passenger-cars-and-light-commercial-vehicles/powertrain-systems/electric-drive/eaxle/, 2 pages.

Morel, L. et al., "Study of ultra high speed switched reluctance motor drive," Conference Record of the 2000 IEEE Industry Applications Conference. Thirty-Fifth IAS Annual Meeting and World Conference on Industrial Applications of Electrical Energy (Cat. No.00CH37129), Oct. 2000, pp. 87-92, vol. 1, IEEE, Rome, Italy.

El-Shahat, Adel et al., "Ultra-High Speed Switched Reluctance Motor-Generator for Turbocharger Applications," Energy Procedia, Apr. 2019, pp. 359-368, vol. 162.

Invitation to Pay Additional Fees and, Where Applicable, Protest Fee issued in International Application No. PCT/US2022/032844, mailed Sep. 20, 2022, 14 pages.

Renk Gmbh, "Recovar® -E. Variable-speed drives for compressors and pumps.," 2021, 12 pages.

* cited by examiner

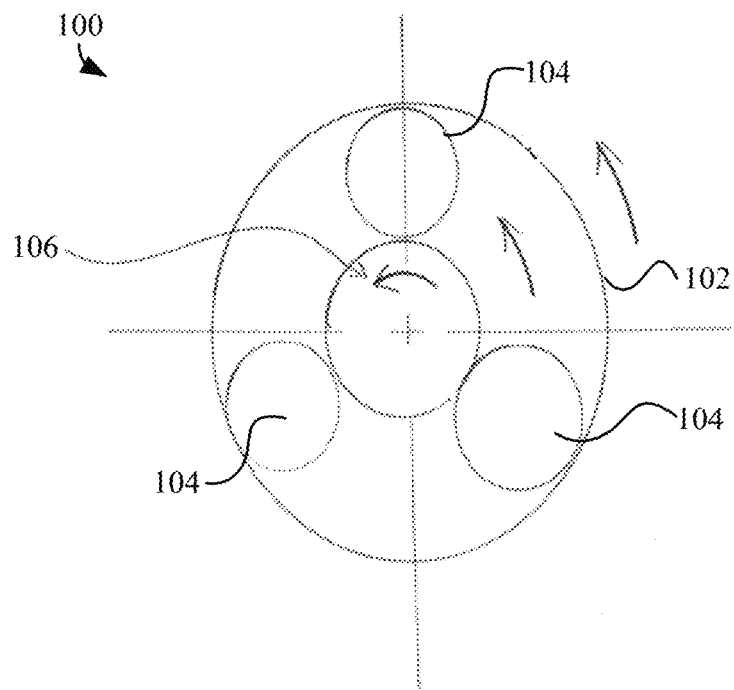
Figure 1
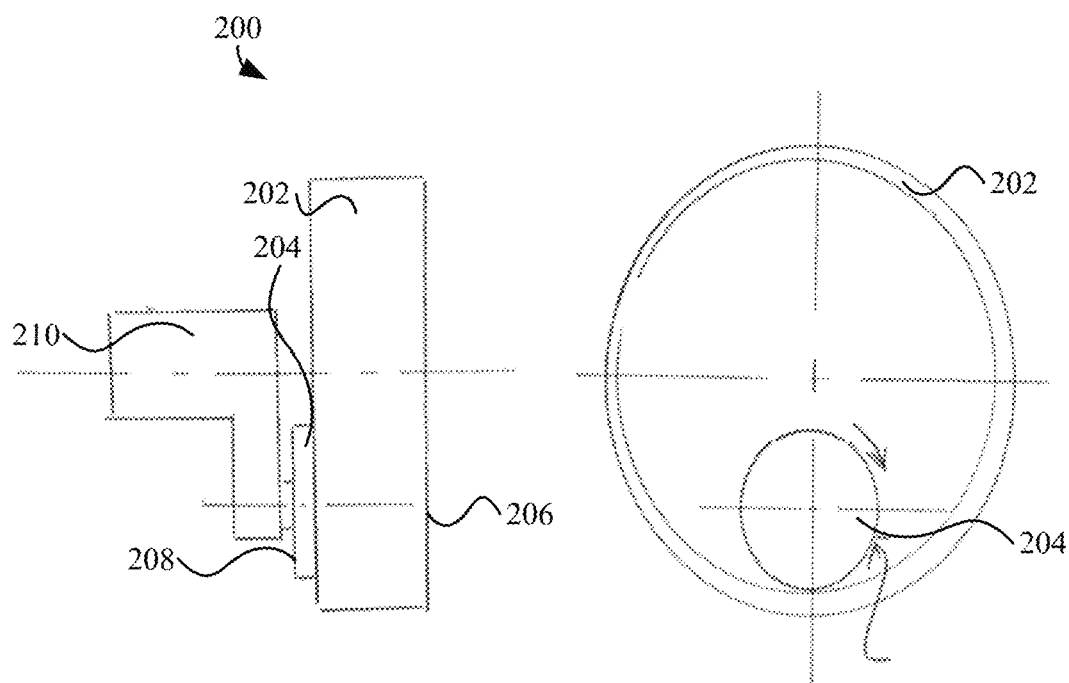
Figure 2A
Figure 2B

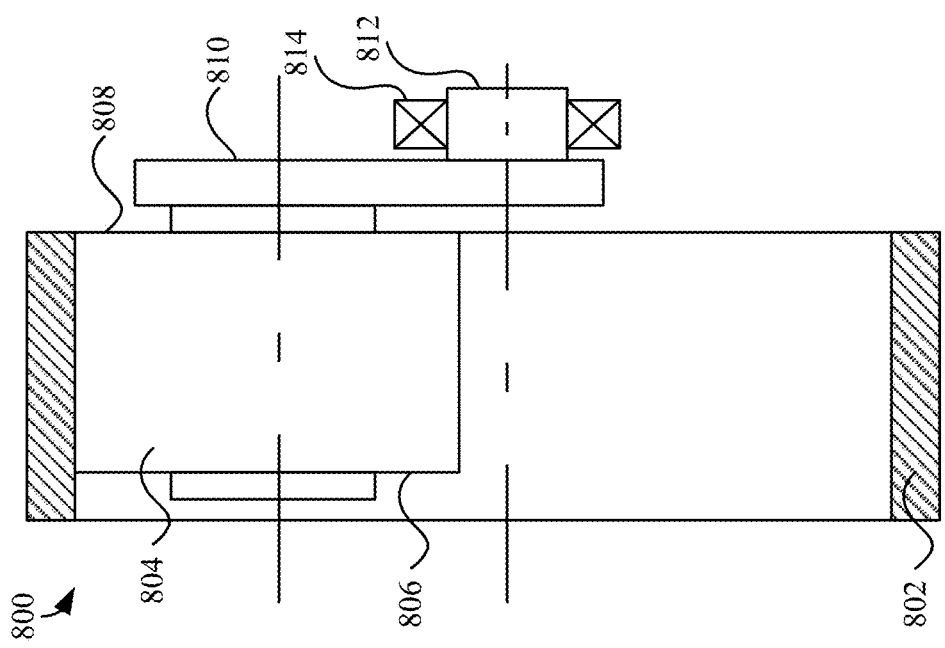
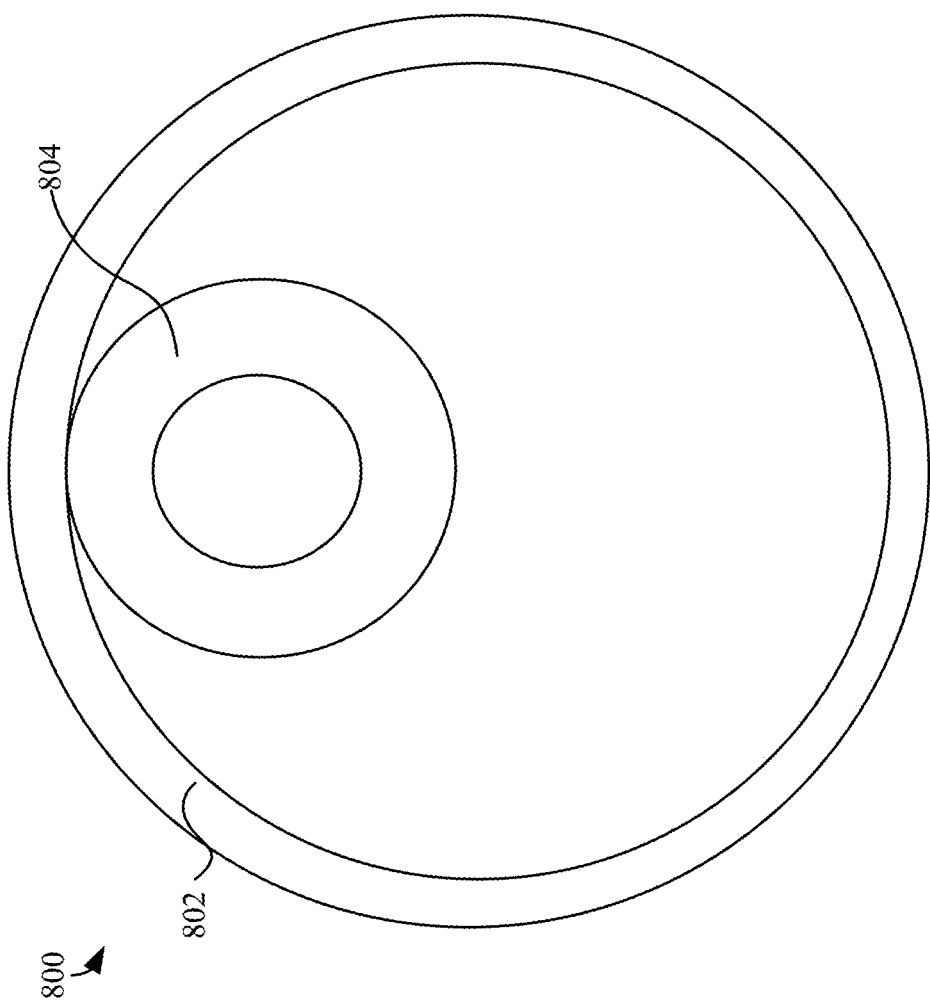
Figure 8B
Figure 8A

VARIABLE ELECTRIC TRANSMISSION SYSTEM AND METHOD

CROSS-REFERENCE TO RELATED APPLICATIONS

This application is continuation of International Application No. PCT/US2022/032844, filed Jun. 9, 2022, which claims the benefit of U.S. Provisional Patent Application Ser. No. 63/209,720, filed Jun. 11, 2021, which are hereby incorporated by reference in their entirety.

BACKGROUND

Traditional gasoline and diesel powered vehicles emit greenhouse gases and, as more and more countries attempt to lower emissions, there is an increased demand for electric vehicles and equipment. Therefore, design and efficiency of electric vehicles and equipment, including their transmission systems, is more important than ever. There exists a need for more efficient and more flexible transmission systems for electric vehicles to meet this increased demand.

BRIEF SUMMARY

Variable electric transmission systems and methods are provided. Advantageously, the simple designs of the variable electric transmission systems described herein allow for independent control of individual wheels (e.g., along an axle or in single wheel configurations) in an electric and/or hybrid vehicle/equipment while simultaneously using methods that select the most efficient Speed Pair (e.g., of the inputs) to provide the desired output speed. In addition, certain embodiments of the variable electric transmission systems and methods described herein allow for a conjoined design that allows the sharing of an input for a three input, two output design. Furthermore, by providing a moment offset supported by one or more bearings as provided in certain implementations of a variable electric transmission system described herein, torque multiplication is achieved.

A variable electric transmission system can be used to set a drive ratio of a transmission and includes a first gear system including a first gear, a second gear, and a third gear, wherein the first gear, the second gear, and the third gear are each mechanically engaged with at least one of the other gears of the first gear system. The system further includes a first rotary input coupled to the first gear, a second rotary input coupled to the second gear, and a first rotary output coupled to the third gear.

In some cases, the system further includes a second gear system including a fourth gear, a fifth gear, and a sixth gear, wherein the fourth gear, the fifth gear, and the sixth gear are each mechanically engaged with at least one of the other gears of the second gear system. In some cases, the system further includes the first rotary input coupled to the fourth gear on an opposing side from the first gear, a third rotary input coupled to the fifth gear, and a second rotary output coupled to the sixth gear.

In some cases, the system further includes a first spur gear and a second spur gear, wherein the first rotary input is coupled to the first gear via the first spur gear and the second rotary input is coupled to the second gear via the second spur gear. In some cases, the system further includes a first rotary input bearing coupled to the first rotary input and a second rotary input bearing coupled to the second rotary input. In some cases, the system further includes one or more rotary output bearings coupled to the first rotary output. In some cases, the first gear system is configured to achieve a moment offset to support torque forces on the first rotary input, the second rotary input, and the first rotary output. In some cases, the first rotary input bearing and the second rotary input bearing are not coaxial with the first rotary output bearing. In some cases, the first rotary input bearing, the second rotary input bearing, and the first rotary output bearing are coupled to transmission mounts.

In some cases, during operation, the first rotary input moves the first gear at a same peripheral speed as the secondary rotary input moves the second gear for a neutral operation of the first rotary output via the third gear. In some cases, during operation, the first rotary input moves the first gear at a faster peripheral speed as the secondary rotary input moves the second gear for a forward operation of the first rotary output via the third gear. In some cases, during operation, the first rotary input moves the first gear at a slower peripheral speed as the secondary rotary input moves the second gear for a reverse operation of the first rotary output via the third gear.

In some cases, the first gear is an outer ring gear, the second gear is an inner sun gear, and the third gear is a plurality of planetary gears. In some cases, the first gear is an outer ring gear, the second gear is an inner sun gear, and the third gear is an eccentric gear. In some cases, the system further includes a double-eccentric gear engaging the outer ring gear and the inner sun gear, wherein the eccentric gear is coupled to the double-eccentric gear. In some cases, a base diameter of the outer ring gear and the inner sun gear are equal and the double-eccentric gear is conical shaped to accommodate the equal base diameter of the outer ring gear and the inner sun gear. In some cases, the system further includes gear teeth on each of the outer ring gear, the inner sun gear, and the double-eccentric gear. In some cases, the system further includes friction control on each of the outer ring gear, the inner sun gear, and the double-eccentric gear.

In some cases, during operation, movement of the first rotary input and the second rotary input are simultaneously adjusted until a desired output speed is reached. In some cases, during operation, transmission of power is reversed to provide a braking force to the first rotary output or energy recovery to a power source.

A method of controlling a variable electric transmission system includes receiving a desired first rotary output speed, determining a constant speed line required to produce the desired first rotary output speed using a general speed line equation, measuring an actual output speed of the first rotary output of the transmission system, comparing the desired first rotary output speed to the actual output speed of the first rotary output of the transmission system, adjusting the first rotary input of the transmission system and the second rotary input of the transmission system until the desired first rotary output speed matches the actual output speed of the first rotary output of the transmission system, and optimizing the first rotary input of the transmission system and the second rotary input of the transmission system to a most efficient Speed Pair for the desired first rotary output based on an efficiency map.

In some cases, the method further includes receiving a desired second rotary output speed, determining a constant speed line required to produce the desired second rotary output speed using a general speed line equation, measuring an actual output speed of the second rotary output of the transmission system, comparing the desired second rotary output speed to the actual output speed of the second rotary output of the transmission system, adjusting the third rotary input of the transmission system and the fourth rotary input of the transmission system until the desired second rotary output speed matches the actual output speed of the second rotary output of the transmission system, and optimizing the third rotary input of the transmission system and the fourth rotary input of the transmission system to a most efficient Speed Pair for the desired second rotary output based on an efficiency map.

In some cases, the method further includes matching the actual output speed of the first rotary output of the transmission system to the actual speed of the second rotary output of the transmission system for a straight-line driving motion. In some cases, the method further includes receiving an indication of a left turning motion and in response to the indication of the left turning motion, decreasing the actual speed of the first rotary output of the transmission system relative to the actual speed of the second rotary output of the transmission system. In some cases, the method further includes receiving an indication of a right turning motion and in response to the indication of the right turning motion, increasing the actual speed of the first rotary output of the transmission system relative to the actual speed of the secondary rotary output of the transmission system.

In some cases, the first rotary input of the variable transmission system is coupled to a first motor and the second rotary input of the transmission system is coupled to a second motor, and the method further includes starting the first motor or the second motor under zero torque load. In some cases, the method further includes reducing transmission of motor torque ripple.

A variable transmission system in the form of a conjoined system for setting a drive ratio of a transmission includes a left gear system, a right gear system, a first rotary input coupled to the left gear system and the right gear system, a second left rotary input coupled to the left gear system, a second right rotary input coupled to the right gear system, a left rotary output coupled to the left gear system, and a right rotary output coupled to the right gear system. In some cases, during operation a speed of the left rotary output is independent of a speed of the right rotary output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 illustrates a non-fixed planetary gear set.
FIGS. 2A and 2B illustrate an eccentric gear set.
FIGS. 8A and 8B illustrate asymmetry supported by bearings applied to an eccentric gear set.

DETAILED DESCRIPTION

Figures 3A, 3B:
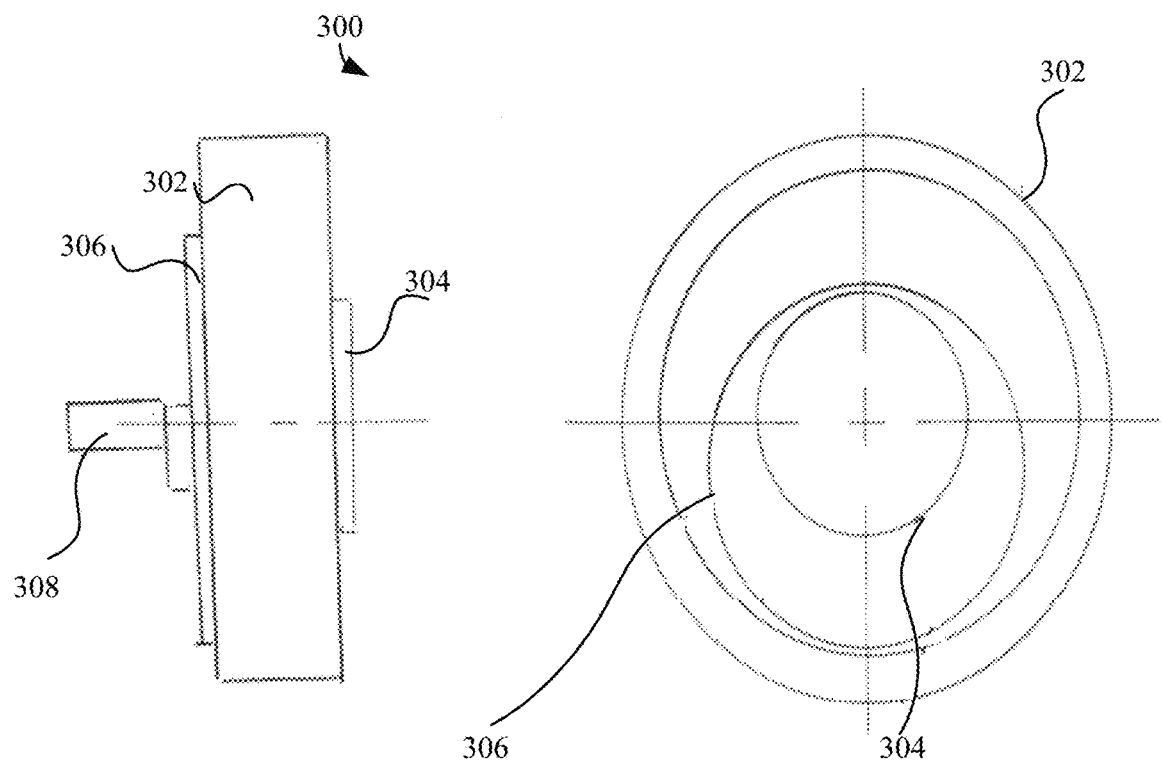
FIG. 3A-3D illustrate a double-eccentric gear set.

Variable electric transmission systems and methods are provided. Advantageously, the simple designs of the variable electric transmission systems described herein allow for independent control of individual wheels (e.g., along an axle or in single wheel configurations) in an electric and/or hybrid vehicle/equipment while simultaneously using methods that select the most efficient Speed Pair (e.g., of the inputs) to provide the desired output speed. In addition, certain embodiments of the variable electric transmission systems and methods described herein allow for a conjoined design that allows the sharing of an input for a three input, two output design. Furthermore, by providing a moment offset supported by one or more bearings as provided in certain implementations of a variable electric transmission system described herein, torque multiplication is achieved.

There are many different configurations for gear sets that can be used for the described variable electric transmission systems, including those illustrated in FIGS. 1, 2A, 2B, 3A-3D, and 4.

FIG. 1 illustrates a non-fixed planetary gear set. Referring to FIG. 1, a non-fixed planetary gear set 100 includes an outer ring gear 102, a plurality of planetary gears 104, and an inner sun gear 106. In some cases, the outer ring gear 102 is coupled to a first rotary input, the inner sun gear 106 is coupled to a second rotary input, and the plurality of planetary gears 104 is coupled to a rotary output (e.g., via a planet gear carrier).

With this configuration of inputs and output, during operation, the planetary gear set 100 has the first rotary input moving the outer ring gear 102 and the second rotary input moving the inner sun gear 106 at the same peripheral and/or rotational speed (e.g., in an opposite direction of one another) for a neutral operation of the rotary output, via the plurality of planetary gears 104; has the first rotary input moving the outer ring gear 102 at a faster peripheral and/or rotational speed than the second rotary input moving the sun gear 106 for a forward operation of the rotary output, via the plurality of planetary gears 104; and has the first rotary input moving the outer ring gear 102 at a slower peripheral and/or rotational speed than the second rotary input moving the sun gear 106 for a reverse operation of the rotary output, via the plurality of planetary gears 104.

FIGS. 2A and 2B illustrate an eccentric gear set. Referring to FIGS. 2A and 2B, the eccentric gear set 200 includes an outer ring gear 202, an inner sun gear 204 having an input side 206 and an output side 208, an eccentric crank gear 210 coupled to output side 208 of the inner sun gear 204, a first rotary input coupled to the outer ring gear 202, a second rotary input coupled to the input side 206 of the inner sun gear 204, and a first rotary output coupled to the eccentric crank gear 210.

With this configuration of inputs and output, during operation, the eccentric gear set 200 has the first rotary input moving the outer ring gear 202 and the second rotary input moving the inner sun gear 204 at the same peripheral and/or rotational speed (e.g., in an opposite direction of one another) for a neutral operation of the eccentric crank gear 210 (e.g., no orbital motion of the eccentric crank gear 210); has the first rotary input moving the outer ring gear 202 at a faster peripheral and/or rotational speed than the second rotary input moving the inner sun gear 204 for a forward operation of the eccentric crank gear 210 (e.g., positive orbital motion of the eccentric crank gear 210); and has the first rotary input moving the outer ring gear 202 at a slower peripheral and/or rotational speed than the second rotary input moving the inner sun gear 204 for a reverse operation of the eccentric crank gear 210 (e.g., negative orbital motion of the eccentric crank gear 210).

FIGS. 3A-3D illustrate a double-eccentric gear set. Referring to FIGS. 3A and 3B, a double-eccentric gear set 300 includes an outer ring gear 302, an inner sun gear 304, a double-eccentric gear 306 engaging the outer ring gear 302 and the inner sun gear 304, an eccentric crank gear 308 coupled to the to the double-eccentric gear 306, a first rotary input coupled to the outer ring gear 302, a second rotary input coupled to the inner sun gear 304, and a first rotary output coupled to the eccentric crank gear 308.

With this configuration of inputs and output, during operation, the eccentric gear set 300 has the first rotary input moving the outer ring gear 302 and the second rotary input moving the inner sun gear 304 at the same peripheral and/or rotational speed (e.g., in an opposite direction of one another) for a neutral operation of the eccentric crank gear 308; has the first rotary input moving the outer ring gear 302 at a faster peripheral and/or rotational speed than the second rotary input moving inner the sun gear 304 for a forward operation of the eccentric crank gear 308; and has the first rotary input moving the outer ring gear 302 at a slower peripheral and/or rotational speed than the second rotary input moving the inner sun gear 304 for a reverse operation of the eccentric crank gear 308.

Figures 3C, 3D:
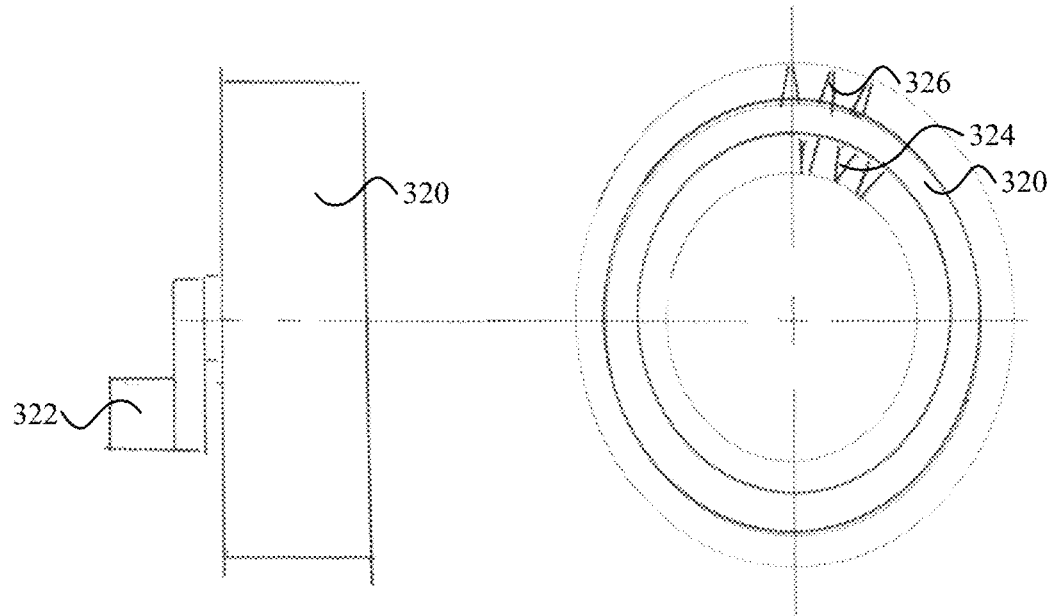

Referring to FIGS. 3C and 3D, a double-eccentric gear 320 is coupled to an eccentric crank gear 322 (e.g., not illustrating an inner sun gear or an outer ring gear). The double-eccentric gear 320 includes internal teeth 324 for engaging an inner sun gear (e.g., inner sun gear 304 of FIG. 3A) and external teeth 326 for engaging an outer ring gear (e.g., outer ring gear 302 of FIG. 3A). In other cases, the double-eccentric gear 320 includes friction control (e.g., the double-eccentric gear, inner sun gear, and/or outer ring gear are moved via friction with respect to one another). It should be understood that the eccentric gear set 200 and the planetary gear set 100 described above may also include internal and external teeth and/or friction control. Furthermore, friction control refers to using friction forces created by surfaces of objects (e.g., gears) moving with respect to one another, where the friction forces are large enough to move an otherwise stationary object without significant slippage.

Figure 4:
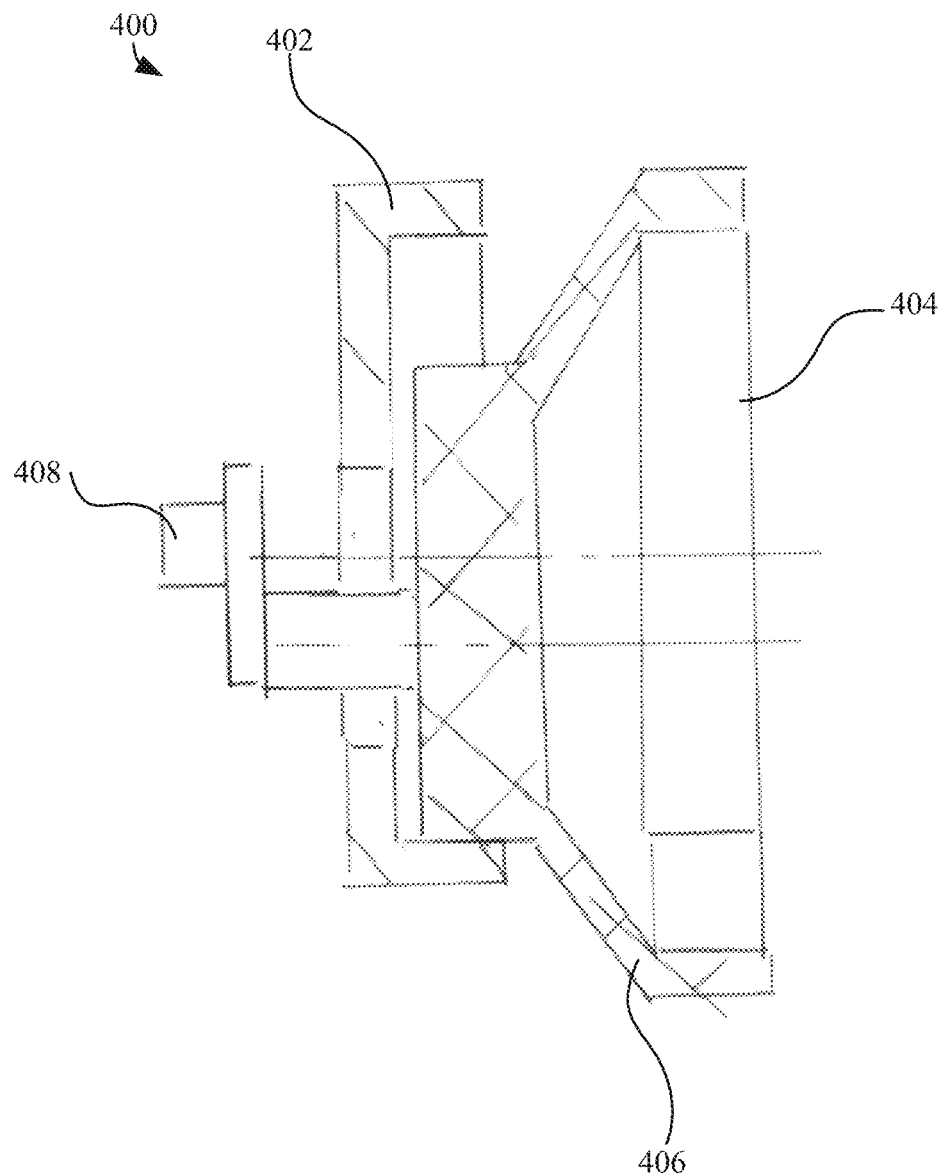
FIG. 4 illustrates a symmetrical double-eccentric gear set.

FIG. 4 illustrates a symmetrical double-eccentric gear set. Referring to FIG. 4, the symmetrical double-eccentric gear set 400 includes an outer ring gear 402, an inner sun gear 404, a conical-shaped double-eccentric gear 406 engaging the outer ring gear 402 and the inner sun gear 404, an eccentric crank gear 408 coupled to the conical-shaped double-eccentric gear 406, a first rotary input coupled to the outer ring gear 402, and a second rotary input coupled to the inner sun gear 404. In some cases, the diameter of the outer ring gear 402 and the inner sun gear 404 is the same due to the conical-shaped double-eccentric gear 406, advantageously permitting the input speed to be closer than other configurations and balance loads. In other words, the conical shape of the conical-shaped double-eccentric gear 406 accommodates the equal base diameter of the outer ring gear 402 and the inner sun gear 404.

It should be understood that although the output and the first input and the second input are defined with respect to each system/configuration above, the output and the first input and/or the second input may be coupled to any one of the gears described with that respective system.

Figure 5:
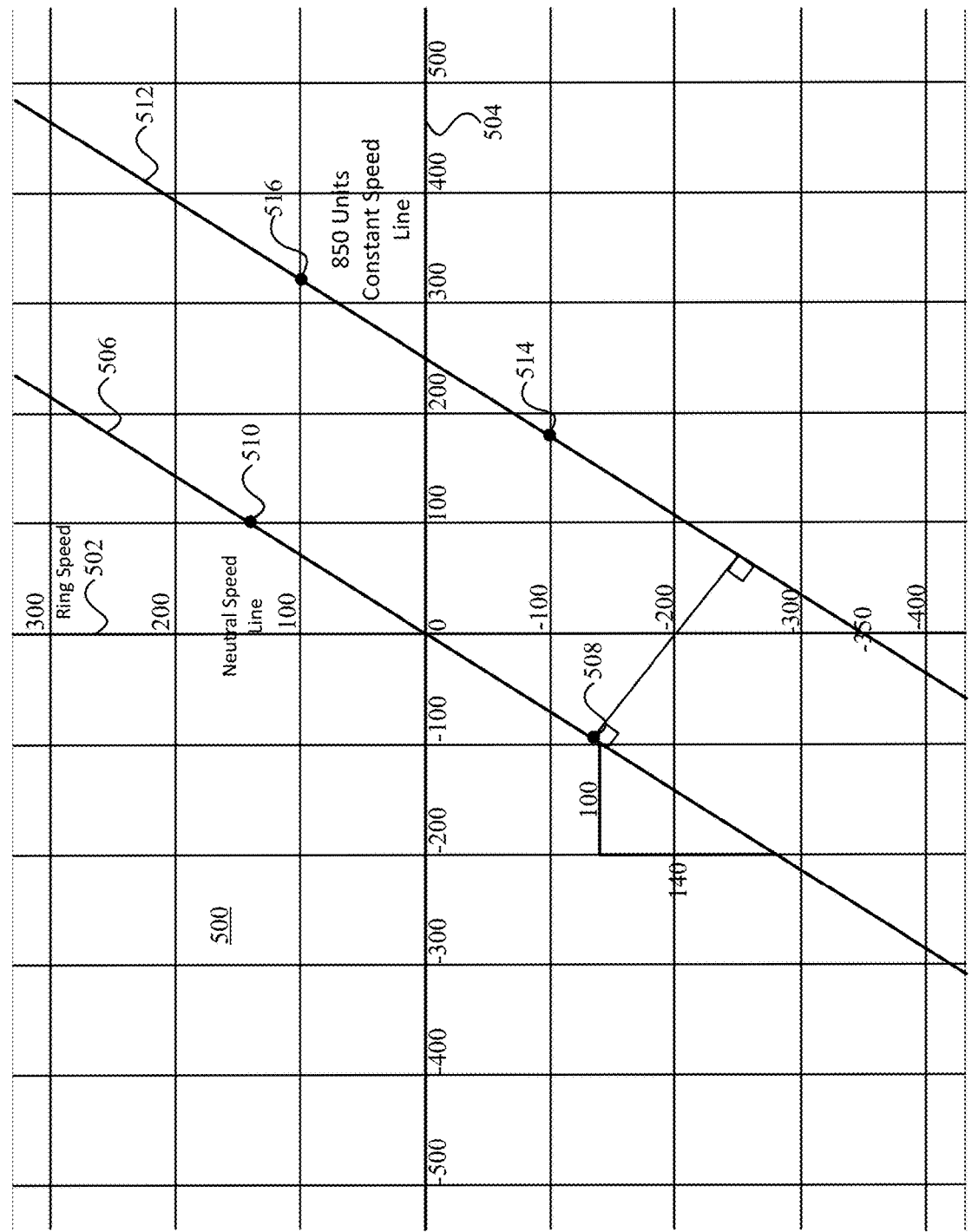
FIG. 5 illustrates a graph of speed pairs for a non-fixed planetary gear set with the sun gear as the output.

FIG. 5 illustrates a graph of Constant Speed Lines for a non-fixed planetary gear set with the sun gear as the output. Each line is composed of an infinite number of Speed Pairs. A Speed Pair refers to a pair of numbers representing the speeds of inputs (e.g., the first and second rotary inputs). In theory, the range of Speed Pairs is infinite, but in practical application, the Speed Pairs are limited by bearing, gearing, and rotary input maximum speeds. Speed Pairs can be generated by a General Control Law of the specific mechanical configuration (e.g., planetary gear sets, eccentric gear sets, double-eccentric gear sets, and/or symmetric double-eccentric gear sets, as well as the number of teeth and/or diameter of each gear in the gear set). The General Control Law is defined by the gear/element that is used for the output.

A non-fixed planetary gear set has three potential outputs (e.g., the inner sun gear, the plurality of planetary gears, and the outer ring gear), with the remaining two gears being used for inputs. The General Control Law for the peripheral and/or rotational speed of the inner sun gear ($S_{sun}$) as the output, the peripheral and/or rotational speed of the plurality of planetary gears ($S_{planet}$) as the output, and the peripheral and/or rotational speed of the outer ring gear ($S_{ring}$) as the output are as follows:

$$S_{sun}=((T_{sun}+T_{ring})/T_{sun})\times S_{planet}-(T_{ring}/T_{sun})\times S_{ring}$$

$$S_{planet}=(T_{ring}/(T_{sun}+T_{ring}))\times S_{ring}+(T_{sun}/(T_{sun}+T_{ring}))\times S_{sun}$$

$$S_{ring}=((T_{sun}+T_{ring})/T_{ring})\times S_{planet}-(T_{sun}/T_{ring})\times S_{sun}$$

It should be understood that "S" refers to the peripheral and/or rotational speed and that "T" refers to the number of teeth for that gear. However, for friction control designs, the number of teeth can be replaced with the circumference for that component.

The General Control Law for speed of the orbital motion of the eccentric crank gear of an eccentric gear set is as follows:

$$S_{orbit}=S_{Ring}-S_{Sun}\times(T_{Sun}/T_{Ring})$$

As an example, the General Control Law for the peripheral and/or rotational speed of the plurality of planetary gears ($S_{planet}$) as the output yields the General Speed Line Equation:

$$Y=((T_{Ring}+T_{sun})/T_{Ring})\times-S(T_{Ring}/T_{sun})$$

This equation can develop the Speed Line for any desired output speed. The Constant Speed Line includes an infinite number of Speed Pairs for any desired output speed. Indeed, this permits decoupling of the input and output speeds, allowing for maximum efficiency settings on the rotary input sources. It should be understood that the X and Y variables are the same variables from the slope intercept equation of a line (Y=mX+b). In any case, for the General Speed Line Equation, when the output speed is zero, the final term (e.g., "$-S(T_{Ring}/T_{sun})$") drops out and the equation yields the Neutral Speed Line for the specific number of teeth.

Referring to FIG. 5, a graph 500 of Speed Pairs for a non-fixed planetary gear set with the sun gear as the output is illustrated. The graph 500 includes an input for the outer ring gear speed (e.g., along the Y-axis 502), and an input for the plurality of planetary gears speed (e.g., along the X-axis 504). Any combination of outer ring gear speed and plurality of planetary gears speed along neutral line 506 results in an output speed of zero for the sun gear. For example, a Speed Pair with an input of −100 units for the plurality of planetary gears speed and −140 units for the outer ring gear speed (e.g., denoted as point 508) results in an output speed of zero for the sun gear. A Speed Pair with an input of 100 units for the plurality of planetary gears speed and 140 units for the outer ring gear speed (e.g., denoted as point 510) also results in an output speed of zero for the sun gear. Indeed, any Speed Pair found along the neutral line 506 results in an output speed of zero for the sun gear.

Any combination of outer ring gear speed and plurality of planetary gears speed along 850 unit speed line 512 results in an output speed of 850 units for the sun gear. The units may be rotations per minute (RPM), deg/sec, and the like. For example, a Speed Pair with an input of 180 units for the plurality of planetary gears speed and −100 units for the outer ring gear speed (e.g., denoted as point 514) results in an output speed of 850 units for the sun gear. A Speed Pair with an input of 320 units for the plurality of planetary gears speed and 100 units for the outer ring gear speed (e.g., denoted as point 516) results in an output speed of 850 units for the sun gear. Indeed, any Speed Pair found along the 850 unit speed line 512 results in an output speed of 850 units for the sun gear. The slope is 1.4 for both the neutral line 506 and the 850 unit speed line 512 because the slope is determined by the number of teeth in the gear set and/or circumference for the gear set. It should be understood that a change in either input changes the output speed.

As illustrated in the Table 1 below, by changing the inputs, the output changes in a non-linear fashion. For example, with a Speed Pair of 6000 units for the plurality of planetary gears and 8400 units for the outer ring gear (and 20 teeth for the inner sun gear and 50 teeth for the outer ring gear), the output speed is zero for the sun gear. Increasing the planetary input speed by 1 yields an output speed increase of 3.5 for the sun gear (e.g., 0 to 3.5). Increasing both input speeds by 1 yields an output speed increase of only 1 for the sun gear (e.g., 0 to 1), demonstrating the simultaneous change of both input speeds to until a desired output speed is reached (e.g., achieving finer control of output speed). However, by merely changing the speed of the outer ring gear to 8000 units (e.g., from 8400 units), with everything else being the same, the output of the inner sun gear changes to 1000 units.

Table 1 further demonstrates the full range of operation of the electric transmission. Reverse operation (10 units speed) to high forward speed (−1000 units speed). The highly non linear aspect of the device is also shown. With the primary input changing from 9001 to 9500 (5.5%) the output speed changes from −2 to −1000, a 50,000% increase.

TABLE 1

| Input 1, X Planetary Speed | Input 2, Y Ring Speed | Sun Teeth | Ring Teeth | Output Sun Speed |
|---|---|---|---|---|
| 6000 | 8400 | 20 | 50 | 0 |
| 6001 | 8400 | 20 | 50 | 3.5 |
| 6001 | 8401 | 20 | 50 | 1 |

TABLE 1-continued

| Input 1, X Planetary Speed | Input 2, Y Ring Speed | Sun Teeth | Ring Teeth | Output Sun Speed |
|---|---|---|---|---|
| 6000 | 8400 | 20 | 50 | 0 |
| 6000 | 8350 | 20 | 50 | 125 |
| 6000 | 8000 | 20 | 50 | 1000 |
| 6000 | 8995 | 36 | 72 | 10 |
| 6000 | 9000 | 36 | 72 | 0 |
| 6000 | 9001 | 36 | 72 | −2 |
| 6000 | 9002 | 36 | 72 | −4 |
| 6000 | 9003 | 36 | 72 | −6 |
| 6000 | 9100 | 36 | 72 | −200 |
| 6000 | 9500 | 36 | 72 | −1000 |

As illustrated in Table 2 below, changes in variables (e.g., the gear that is used as the output, the speed of either input and/or number of teeth in a gear) results in (sometimes dramatic) changes to the output speed.

TABLE 2

| Input 1, X Sun Speed | Input 2, Y Ring Speed | Sun Teeth | Ring Teeth | Output Carrier Speed |
|---|---|---|---|---|
| 1000 | −400 | 20 | 50 | 0 |
| 1000 | −500 | 20 | 50 | −71 |
| 1000 | −600 | 20 | 50 | −143 |
| 1000 | −700 | 20 | 50 | −214 |

| Carrier Speed | Sun Speed | Sun Teeth | Ring Teeth | Ring Speed |
|---|---|---|---|---|
| 1000 | 3500 | 20 | 50 | 0 |
| 1000 | 500 | 40 | 50 | 1400 |
| 1000 | 1000 | 20 | 50 | 1000 |

| Ring Speed | Sun Speed | Sun Teeth | Ring Teeth | Orbit Speed |
|---|---|---|---|---|
| 1000 | 1333 | 30 | 40 | 0.25 |
| 1000 | 1500 | 30 | 40 | −125 |
| 1000 | 1800 | 30 | 40 | −350 |

The above represents the control of the output speed via the two rotary inputs, however, the functions required are dependent on the type of control methods used. For some applications, the controls may specify input motor power and allow the system to find a natural set point between the three opposing torques (two inputs and one output). If both speed inputs are specified (as described above), the system is positively controlled. If one speed input is specified and other input power is specified, the system is semi-positively controlled. If both inputs are power controlled, the system is floating controlled. Indeed, there are three main types of system control; power-based control, efficiency-based control, and speed-based control. Either one of the inputs may use a common or different method of control, and the methods of control may be changed during operation.

Speed-based control specifies the speed of an input (as described above). Power-based control is achieved by direct throttling of the power available to the drive motor (e.g., via the Pulse Width Modulation method, which is similar to the driver of a gasoline powered vehicle controlling speed via a throttle). Efficiency-based control requires an efficiency map of the motor being used to control the input. The map is plotted with constant power curves and the intersection of each curve with the highest efficiency. The resulting curve is used to specify a motor speed as a function of desired power.

Figure 6:
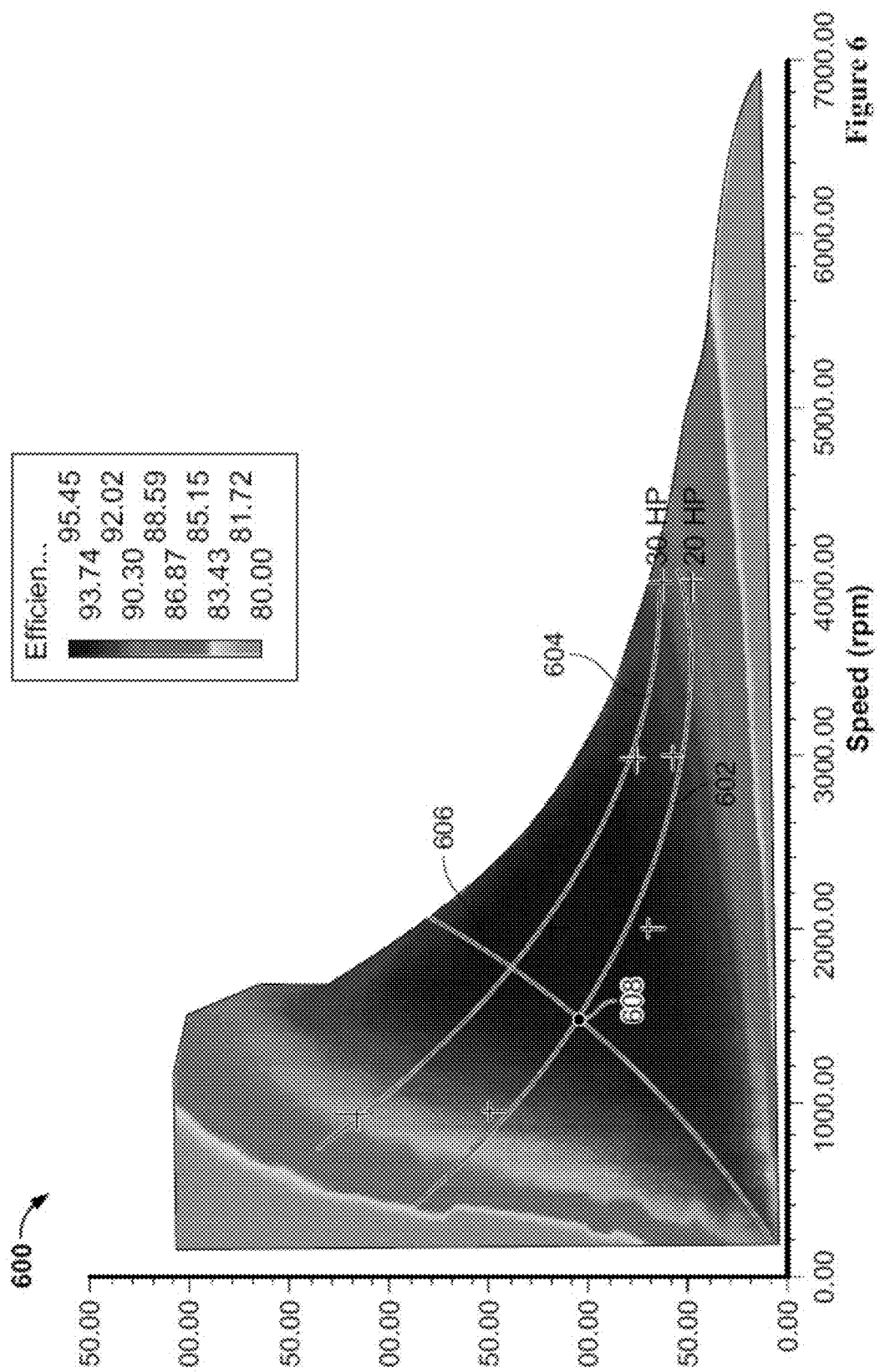
FIG. 6 illustrates an efficiency map used to select motor speed as a function of desired power.

FIG. 6 illustrates an efficiency map used to select motor speed as a function of desired power. Referring to FIG. 6, an efficiency map 600 of a motor is illustrated. A constant power curve for twenty horsepower 602 and thirty horsepower 604 is plotted with the efficiency map 600. An optimal efficiency curve 606 is also plotted. Therefore, for any desired speed and/or power input, the most efficient point along the optimal efficiency curve 606 can be selected. For example, if twenty horsepower is desired, the intersection 608 of the optimal efficiency curve 606 and the constant power curve for twenty horsepower 602 can be selected as the input.

As an example, efficiency-based control may be used as the first input and power-based control may be used as the second input. When the output of 30% power is desired, the first input will operate at the speed associated with the highest efficiency at that power level. The secondary input will simply be provided 30% of the maximum power. The system will then float to its natural output speed for the given inputs and output load (which is semi-positive control). This should be at or near the torque level associated with the primary input's highest efficiency and the optimum efficiency of the secondary input. To achieve this, the system will balance the input motor's torque demands by selecting the correct planetary gear ratio.

The three types of control described above can be modified for different applications. Soft starting and more precise speed control can be achieved via compound speed adjustment, which is a modification of positive control. In this case both primary and secondary input speeds are changed together and in collaboration. This permits more precise control of output speed. In the case of slow speed operation of a vehicle, the system may select compound speed adjustment to provide better control and then switch to another mode for acceleration and high speed operation.

Sawtooth control is another modification of positive control. In this case, the second input speed is adjusted and the first input speed is fixed. Once the second input speed reaches a desired maximum, both the first and second input speeds are adjusted down along the constant speed line to the desired minimum second input speed. The second input speed then increases with the first input speed being fixed, and the process repletes. This permits both inputs to operate in a narrower speed range.

Sport control is an extension of sawtooth control. In this case, the sawtooth control is amplified by the system and designed to be "felt." This simulates shifting in a conventional transmission.

Regenerative braking is achieved by utilizing the motors for the inputs are generators. In this case, the mechanical output becomes the system input. The motors are controlled to oppose this input by moving along the Speed Lines to reach the Neutral Speed Line. In some cases, during operation, power transmission is reversed to provide braking and energy recovery.

Positive Control Selection of Speed Pairs always specifies the speed of both the first and second inputs. A system performing positive control selection of speed pairs first determines the Constant Speed Line required to produce the desired output speed, using the General Speed Line Equation. Next, the current output speed is measured and compared to the desired output speed. The Speed Pair is then adjusted by accelerating or decelerating the input speeds to generate the desired output speed. The power provided or removed from the inputs (e.g., the motors) is in proportion to the difference between the measured and desired speed. The system calculates and controls the power based on its control algorithm, which is dependent on the specific application (e.g., sports car vs truck). The system also monitors the progression of each input speed towards the Speed Line and adjusts relative power to assure they move collectively. Once the desired speed is achieved, the system optimizes to the most efficient Speed Pair for the current conditions (e.g., based on the efficiency map). The power provided to the primary drive is measured and compared to the power vs efficiency curve created from the efficiency map. The speed of the first input is adjusted to this speed, and the second input is adjusted to the corresponding value for that Speed Pair, keeping both of the inputs on the constant speed line.

Figure 7:
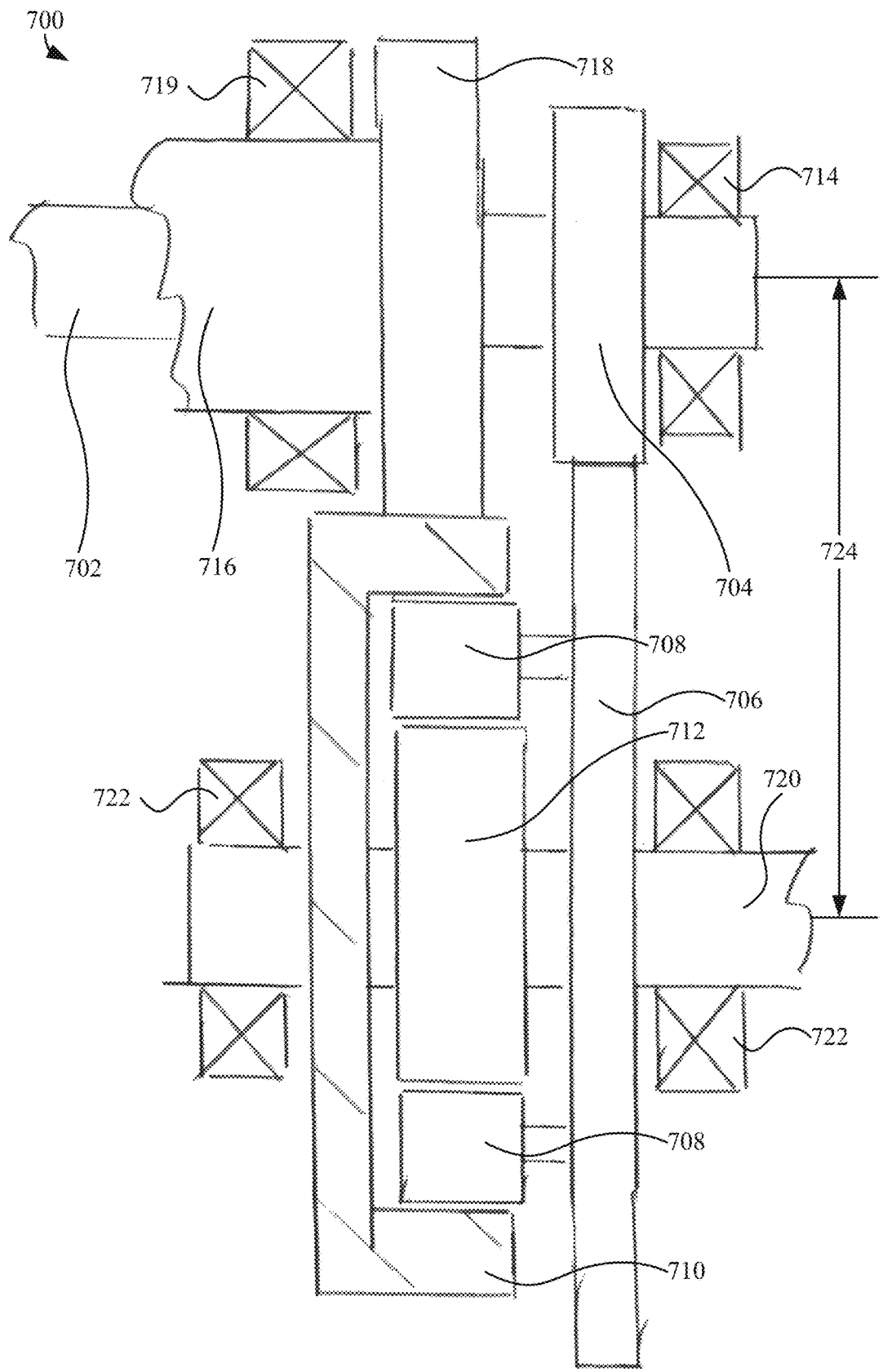
FIG. 7 illustrates a moment offset supported by bearings applied to a non-fixed planetary gear set.

FIG. 7 illustrates a moment offset supported by bearings applied to a non-fixed planetary gear set. Referring to FIG. 7, the non-fixed planetary gear set 700 includes a first rotary input 702 coupled to a first spur gear 704; the first spur gear 704 is mechanically engaged with a planet gear carrier 706 (e.g., the first rotary input 702 drives the planet gear carrier 706 via the first spur gear 704). In some cases, the planet gear carrier 706 is mechanically engaged with the first spur gear 704 via external teeth; in some cases, the planet gear carrier 706 is mechanically engaged with the first spur gear 704 via friction control. The planet gear carrier 706 also includes a plurality of planetary gears 708 that are mechanically engaged (e.g., via external teeth or friction control) with an outer ring gear 710 and an inner sun gear 712. A first rotary input bearing 714 that is coupled to the first rotary input 702 is included to support torque forces on the first rotary input 702.

The non-fixed planetary gear set 700 further includes a second rotary input 716 coupled to a second spur gear 718; the second spur gear 718 is mechanically engaged with the outer ring gear 710 (e.g., the second rotary input 716 drives the outer ring gear 710 via the second spur gear 718). In some cases, the outer ring gear 710 is mechanically engaged with the second spur gear 718 via external teeth; in some cases, the outer ring gear 710 is mechanically engaged with the second spur gear 718 via friction control. The outer ring gear 710 is also mechanically engaged (e.g., via internal teeth or friction control) with the plurality of planetary gears 708. A second rotary input bearing 719 that is coupled to the second rotary input 716 is included to support torque forces on the second rotary input 716. In this example, the second rotary input 716 is hollow, which allows for the first rotary input 702 to be placed within the second rotary input so that the first and second rotary inputs 702, 716 are aligned and/or run along the same axis.

The non-fixed planetary gear set 700 further includes a first rotary output 720 coupled to the inner sun gear 712; the inner sun gear 712 is mechanically engaged (e.g., via external teeth or friction control) with the plurality of planetary gears 708. As described above, the movement of the inner sun gear 712 is dependent on the rotational movement (e.g., RPM) of the plurality of planetary gears 708/planet gear carrier 706 and the outer ring gear 710. One or more output bearings 722 that are coupled to the first rotary output 720 are also included to support torque forces on the first rotary output 720. As illustrated, the first rotary input bearing 714 and the second rotary input bearing 719 are not coaxial with the one or more first rotary output bearings 722, which results in radial loading of the torque forces on the bearings 714, 719, and 722. In some cases, the bearings 714, 719, and 722 are coupled to transmission mounts to permit transfer of the torque forces to a frame of a machine (e.g., frame of a vehicle).

Advantageously, with this configuration, a moment offset 724 is achieved that provides torque multiplication and speed range needed for use in automotive applications. Indeed, without the moment offset 724, torque balance for the non-fixed planetary gear set 700 would simply be the summation of input motor torque (e.g., torque supplied via the first rotary input 702 and the second rotary input 716) and the torque on the first rotary output 720, which results in no torque multiplication because those forces essentially cancel each other out. Therefore, by adding the first spur gear 704, the second spur gear 718, and bearings (e.g., first rotary input bearing 714, second rotary input bearing 719, and one or more output bearings 722), the non-fixed planetary gear set 700 includes the moment offset 724 is achieved. As can be seen, the moment offset 724 is equal to the summation of the radius of the first spur gear 704 and the radius of the outer ring gear 710 or the summation of the radius of the second spur gear 718 and the radius of the planet gear carrier 706.

FIGS. 8A and 8B illustrate asymmetry supported by bearings applied to an eccentric gear set. Referring to FIGS. 8A and 8B, the eccentric gear set 800 includes an outer ring gear 802, a planet gear 804 having an input side 806 and an output side 808, an eccentric crank gear 810 coupled to the output side 808 of the planet gear 804, and a first rotary output 812 coupled to the eccentric crank gear 810. The first rotary output 812 includes a first rotary output bearing 814 that is coupled to the first rotary output 812 to support torque forces on the first rotary output 812. Although not illustrated, the eccentric gear set 800 may further include a first rotary input coupled to the outer ring gear 802 and a second rotary input coupled to the input side 806 of the planet gear 804; and the first rotary input and/or the second rotary input may include bearings to support torque forces.

In any case, the asymmetry (e.g., note that the center of the planet gear 804 is never aligned with the first rotary output 812 no matter its position around the outer ring gear 802) created within the eccentric gear set 800 allows for torque multiplication in the eccentric gear set 800, similar to that of the moment offset 724 illustrated in FIG. 7. Therefore, the asymmetry supported by bearings applied to the eccentric gear set 800 can be considered a moment offset. Specifically, when the first and second rotary inputs are powered, a force is applied to the eccentric crank gear 810. This force rotates with the eccentric crank gear 810, thus this force can be thought of as a phasor (e.g., similar to a phasor in an electric motor). This phasor is opposed by phasors developed in the bearings (e.g., first rotary output bearing 814 and bearings coupled to the first rotary input and/or the second rotary input). These reactionary phasors provide the reaction force that allow for torque multiplication in the eccentric gear set 800. Thus, this eccentric gear set 800 effectively creates a moment offset that supports torque multiplication and speed range needed for use in automotive applications.

Figure 9:
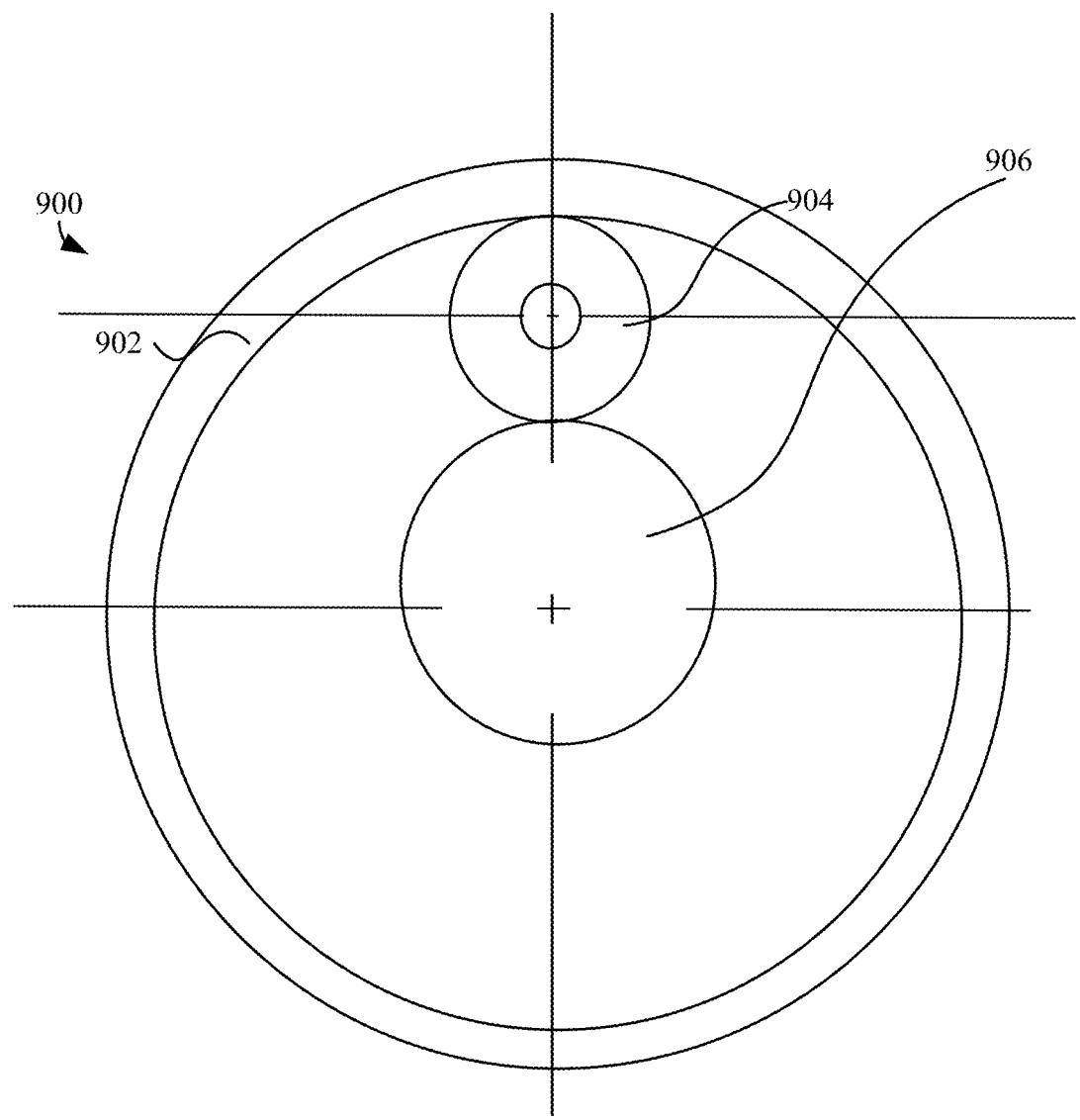
FIG. 9 illustrates asymmetry supported by bearings applied to a non-fixed planetary gear set.

FIG. 9 illustrates asymmetry supported by bearings applied to a non-fixed planetary gear set. Referring to FIG. 9, the non-fixed planetary gear set 900 includes an outer ring gear 902, a single planet gear 904 (e.g., as opposed to a plurality of planetary gears illustrated in FIGS. 1 and 7), and an inner sun gear 906. Although not illustrated, this non-fixed planetary gear set 900 further includes a planet gear carrier coupled to the single planet gear 904, a first rotary output coupled to the planet gear carrier, a first rotary input coupled to the outer ring gear, a second rotary input coupled to the inner sun gear 906, and bearings coupled to the first and second rotary inputs and the first rotary output. Thus, by only including a single planet gear 904, this non-fixed planetary gear set 900 supports torque multiplication and speed range needed for use in automotive applications by developing phasor reaction forces similar to that described above with respect to FIGS. 8A and 8B.

Figure 10:
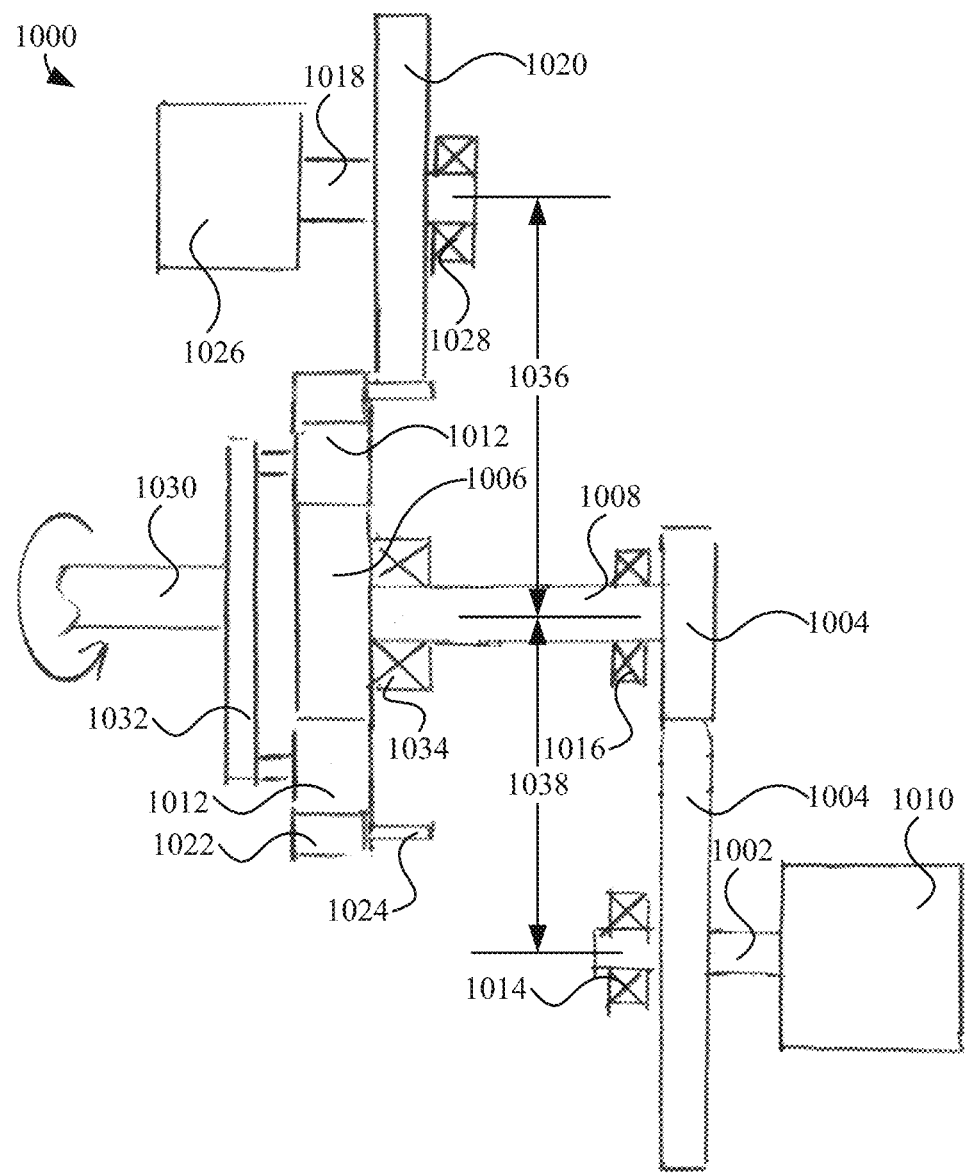
FIG. 10 illustrates two moment offsets supported by bearings applied to an asymmetric non-fixed planetary gear set.

FIG. 10 illustrates two moment offsets supported by bearings applied to an asymmetric non-fixed planetary gear set. Referring to FIG. 10, the asymmetric non-fixed planetary gear set 1000 includes a first rotary input 1002 coupled to a first spur gear set 1004; the first spur gear set 1004 is mechanically engaged with an inner sun gear 1006 via a first rotary input shaft 1008 (e.g., the first rotary input 1002 drives the inner sun gear 1006 via the first spur gear set 1004 and first rotary input shaft 1008). The first rotary input is driven by a first motor 1010. The inner sun gear is mechanically engaged (e.g., via external teeth or friction control) with a plurality of planetary gears 1012. A first rotary input bearing 1014 and a first rotary input shaft bearing 1016 are included to support torque forces on the first rotary input 1002 and first rotary input shaft 1008.

The asymmetric non-fixed planetary gear set 1000 further includes a second rotary input 1018 coupled to a second spur gear 1020; the second spur gear 1020 is mechanically engaged with an outer ring gear 1022 (e.g., the second rotary input 1018 drives the outer ring gear 1022 via the second spur gear 1020). Specifically, the outer ring gear 1022 includes external teeth 1024 that are mechanically engaged with the second spur gear 1020. In some cases, the outer ring gear 1022 is mechanically engaged with the second spur gear 1020 via friction control. The second rotary input 1018 is driven by a second motor 1026. The outer ring gear 1022 is mechanically engaged (e.g., via external teeth or friction control) with the plurality of planetary gears 1012. A second rotary input bearing 1028 that is coupled to the second rotary input 1018 is included to support torque forces on the second rotary input 1018.

The asymmetric non-fixed planetary gear set 1000 further includes a first rotary output 1030 coupled to a planet carrier 1032. The planet carrier 1032 is coupled to the plurality of planetary gears 1012. The plurality of planetary gears 1012 are mechanically engaged (e.g., via external teeth or friction control) with the outer ring gear 1022 and an inner sun gear 1006. As described above, the movement of the planet carrier 1032/plurality of planetary gears 1012 is dependent on the rotational movement (e.g., RPM) of the inner sun gear 1006 and the outer ring gear 1022. One or more rotary output bearings 1034 that are coupled to the first rotary output 1030 are also included to support the torque forces on the first rotary output 1030. As illustrated, the first rotary input bearing 1014 and the second rotary input bearing 1028 are not coaxial with the one or more first rotary output bearings 1034, which results in radial loading of the torque forces on the bearings 1014, 1028 and 1034. In some cases, the bearings 1014, 1028 and 1034 are coupled to transmission mounts to permit transfer of the torque forces to a frame of a machine (e.g., frame of a vehicle).

Advantageously, with this configuration, a first moment offset 1036 (e.g., a vertical distance between the first rotary input 1002 and the first rotary output 1030) and a second moment offset 1038 (e.g., a vertical distance between the second rotary input 1018 and the first rotary output 1030) is achieved that provides torque multiplication and speed range needed for use in automotive applications.

Figure 11:
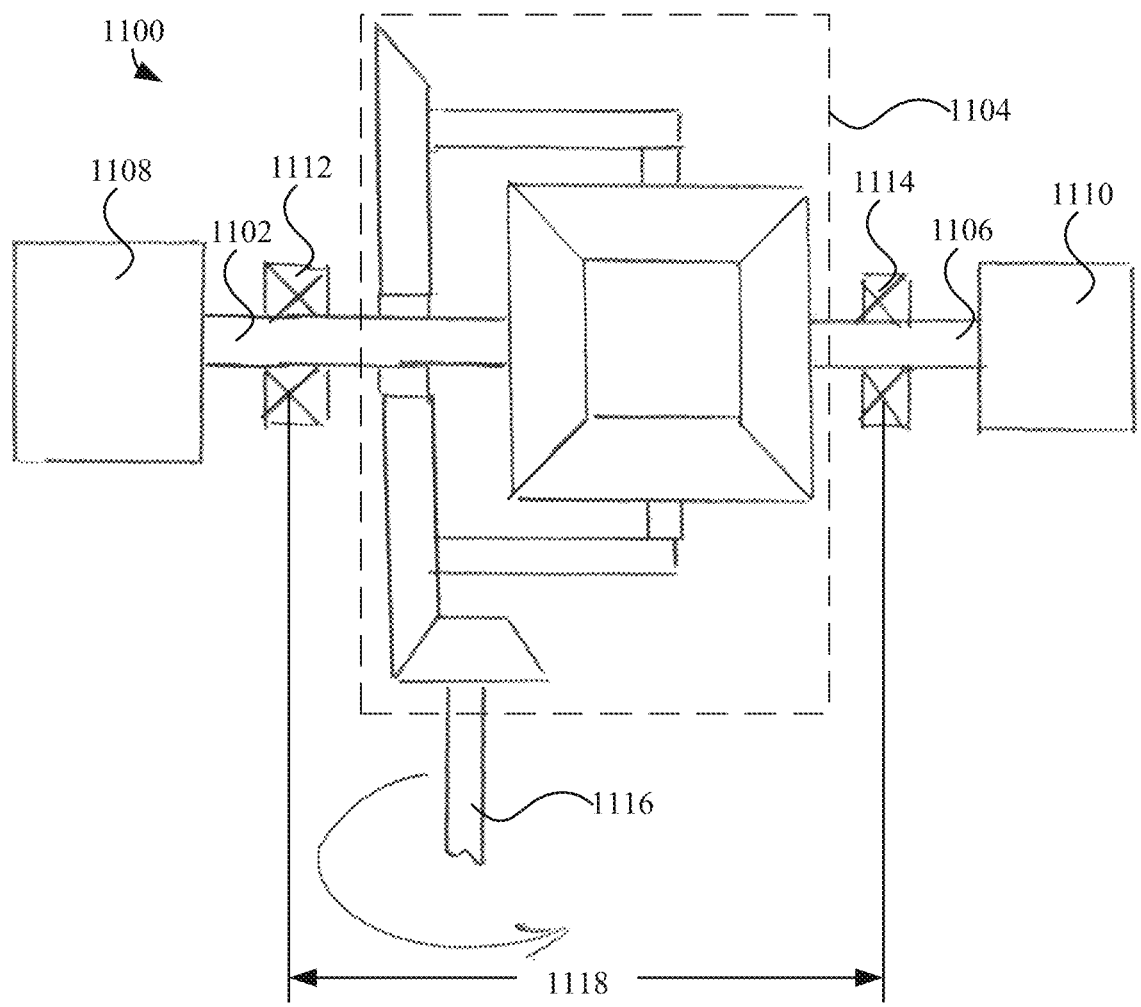
FIG. 11 illustrates a moment offset supported by bearings applied to a T-configuration gear set.

FIG. 11 illustrates a moment offset supported by bearings applied to a T-configuration gear set. Referring to FIG. 11, a T-configuration gear set 1100 includes a first rotary input 1102 that drives a carrier/bevel gear system 1104 and a second rotary input 1106 that also drives the carrier/bevel gear system 1104. The first rotary input 1102 is driven by a first motor 1108 and the second rotary input 1106 is driven by a second motor 1110. A first rotary input bearing 1112 that is coupled to the first rotary input 1102 is included to support torque forces on the first rotary input 1102 and a second rotary input bearing 1114 that is coupled to the second rotary input 1106 is included to support torque forces on the second rotary input 1106. The T-configuration gear set 1100 further includes a first rotary output 1116 that is driven by the carrier/bevel gear system 1104. Advantageously, with this configuration, a moment offset 1118 (e.g., a distance between the first rotary input bearing 1112 and the second rotary input bearing 1114) is achieved that provides torque multiplication and speed range needed for use in automotive applications, including tricycle and/or motorcycle applications.

Figure 12:
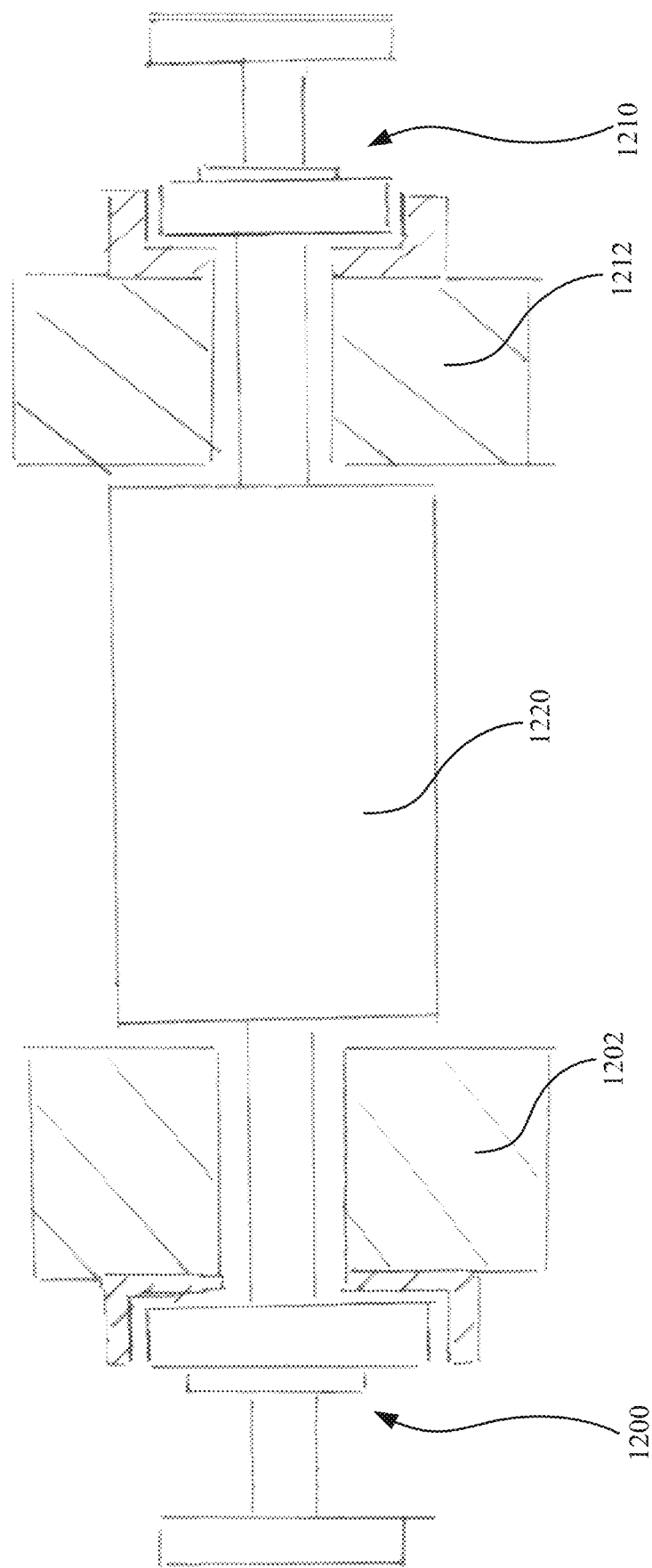
FIG. 12 illustrates two non-fixed planetary gear sets coupled to the same first rotary input but coupled to different second rotary input sources.

FIG. 12 illustrates two planetary gear sets coupled to the same first rotary input but coupled to different second rotary input sources. Referring to FIG. 12, a left planetary gear set 1200 and a right planetary gear set 1210 share a common/the same first rotary input 1220, however, the left planetary gear set 1200 includes a separate second rotary input 1202 from the right planetary gear set 1210, which also includes a separate second rotary input 1212 (e.g., a third rotary input). Therefore, each planetary gear set includes two inputs and one output; and since each planetary gear set includes a common first rotary input, the system as a whole (e.g., both planetary gear sets and their rotary inputs and rotary outputs) includes three inputs and two outputs. In some cases, the shared/common first rotary input is attached to a common gear type (e.g., the shared/common first rotary input is attached to an inner sun gear on each of the two planetary gear sets).

For example, the left planetary gear set 1200 includes an outer ring gear; a plurality of planetary gears; an inner sun gear; a first rotary input 1220 coupled to one of the outer ring gear, the plurality of planetary gears, and the inner sun gear; a second rotary input 1202 coupled to another one of the outer ring gear, the plurality of planetary gears, and the inner sun gear; and a rotary output coupled to a remaining one of the outer ring gear, the plurality of planetary gears, and the inner sun gear. The right planetary gear set 1210 includes a second outer ring gear; a second plurality of planetary gears; a second inner sun gear; the first rotary input 1220 of the second planetary gear system coupled to one of the second outer ring gear, the second plurality of planetary gears, and the second inner sun gear; a third rotary input 1212 coupled to another one of the second outer ring gear, the second plurality of planetary gears, and the second inner sun gear; and a second rotary output coupled to the remaining one of the second outer ring gear, the second plurality of planetary gears, and the second inner sun gear.

As an example, this embodiment permits an e-axle configuration with two driven wheels. If the wheels are required to turn at different speeds (e.g., for turning such as the front wheels on an automobile), the system can determine the optimum Speed Pair for each of the left planetary gear set 1200 and the right planetary gear set 1220; and the speed of the first rotary input 1220 would be the same in each Speed Pair.

Although FIG. 12 illustrates two planetary gear sets coupled to the same first rotary input but coupled to different second rotary input sources, in some cases, two eccentric gear systems, two double eccentric gear systems, or two offset double eccentric gear systems may be coupled to the same first rotary input but coupled to different second rotary input sources. In some cases, different types of gear systems may be coupled to the same first rotary input but coupled to different second rotary input sources (e.g., any combination of two gear sets including a planetary gear set, an eccentric gear set, a double eccentric gear set, and an offset double eccentric gear set) In some cases, a moment offset is further included to provide torque multiplication and speed range needed for use in automotive applications (e.g., as described with respect to FIG. 13).

Figure 13:
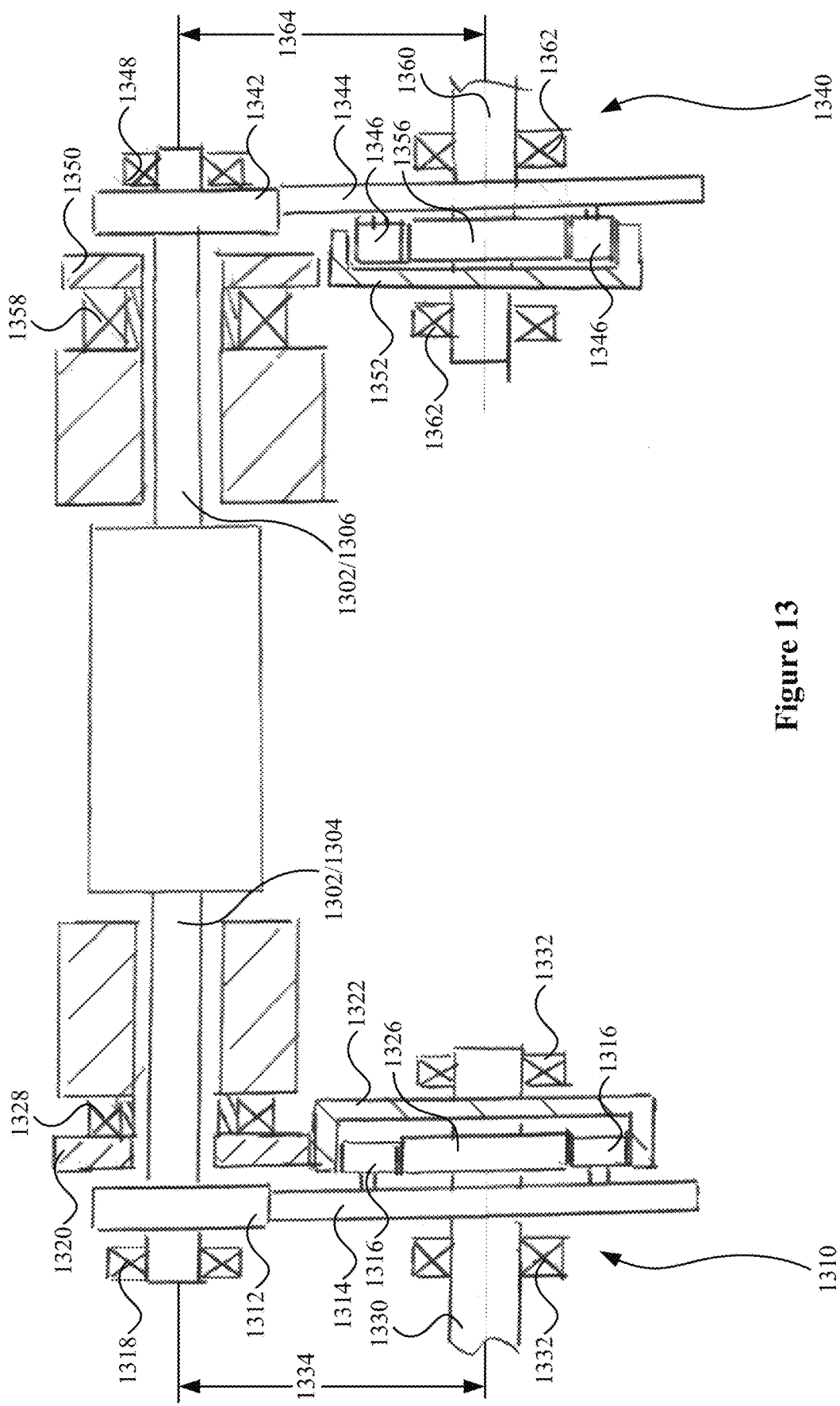
FIG. 13 illustrates a moment offset supported by bearings applied to two non-fixed planetary gear sets coupled to the same first rotary input but coupled to different second rotary input sources.

FIG. 13 illustrates a moment offset supported by bearings applied to two non-fixed planetary gear sets coupled to the same first rotary input but coupled to different second rotary input sources. Referring to FIG. 13, a left non-fixed planetary gear set 1310 and a right non-fixed planetary gear set 1340 share a common/the same first rotary input 1302, however, the left non-fixed planetary gear set 1310 includes a separate second left rotary input 1304 from the right planetary gear set 1340, which also includes a separate second right rotary input 1306 (e.g., a third rotary input). In this embodiment, the second left rotary input 1304 is labeled with a left portion of the first rotary input 1302 and the second right rotary input 1306 is labeled with a right portion of the first rotary input 1302 because the first rotary input 1302 is positioned within the second left rotary input 1304/second right rotary input 1306 (e.g., similar to that illustrated in FIG. 7; the second left rotary input 1304 and the second right rotary input 1306 are each hollow). Therefore, each non-fixed planetary gear set includes two inputs and one output; and since each planetary gear set includes a common first rotary input 1302, the system as a whole (e.g., both planetary gear sets 1310, 1340 and their rotary inputs and rotary outputs) includes three inputs and two outputs. In some cases, the shared/common first rotary input 1302 is attached to a common gear type (e.g., the shared/common first rotary input is attached to an inner sun gear on each of the two planetary gear sets).

In detail, the left non-fixed planetary gear set 1310 includes the first rotary input 1302 coupled to a first left spur gear 1312; the first left spur gear 1312 is mechanically engaged with a left outer ring gear 1314 (e.g., the first rotary input 1302 drives the left outer ring gear 1314 via the first left spur gear 1312). In some cases, the left outer ring gear 1314 is mechanically engaged with the first left spur gear 1312 via external teeth; in some cases, the left outer ring gear 1314 is mechanically engaged with the first left spur gear 1312 via friction control. The left outer ring gear 1314 is mechanically engaged (e.g., via external teeth or friction control) with a left plurality of planetary gears 1316. A first left rotary input bearing 1318 that is coupled to the first rotary input 1302 is included to support torque forces on the first rotary input 1302.

As mentioned above, the left non-fixed planetary gear set 1310 includes a second left rotary input 1304 coupled to a second left spur gear 1320; the second left spur gear 1320 is mechanically engaged with a left planet gear carrier 1322 (e.g., the second left rotary input 1304 drives the left planet gear carrier 1322 via the second left spur gear 1320). In some cases, the left planet gear carrier 1322 is mechanically engaged with the second left spur gear 1320 via external teeth; in some cases, the left planet gear carrier 1322 is mechanically engaged with the second left spur gear 1320 via friction control. The left planet gear carrier 1322 is coupled to a left plurality of planetary gears 1316; the left plurality of planetary gears 1316 is mechanically engaged (e.g., via external teeth or friction control) with the left outer ring gear 1314 and a left inner sun gear 1326. A second left rotary input bearing 1328 that is coupled to the second left rotary input 1304 is included to support torque forces on the second left rotary input 1304.

The left non-fixed planetary gear set 1310 further includes a left rotary output 1330 coupled to the left inner sun gear 1326; the left inner sun gear 1326 is mechanically engaged (e.g., via external teeth or friction control) with the left plurality of planetary gears 1316. As described above, the movement of the left inner sun gear 1326 is dependent on the rotational movement (e.g., RPM) of the left plurality of planetary gears 1316/left planet gear carrier 1322 and the left outer ring gear 1314. One or more left rotary output bearings 1332 that are coupled to the left rotary output 1330 are also included to support torque forces on the left rotary output 1330. This configuration results in a moment offset 1334 (e.g., the vertical distance between the first rotary input 1302/second left rotary input 1304 and the left rotary output 1330) that provides torque multiplication and speed range needed for use in automotive applications. As illustrated, the first left rotary input bearing 1318 and the second left rotary input bearing 1328 are not coaxial with the one or more left rotary output bearings 1332, which results in radial loading of the torque forces on the bearings 1318, 1328, and 1332. In some cases, the bearings 1318, 1328, and 1332 are coupled to transmission mounts to permit transfer of the torque forces to a frame of a machine (e.g., frame of a vehicle).

The right non-fixed planetary gear set 1340 includes the first rotary input 1302 coupled to a first right spur gear 1342; the first right spur gear 1342 is mechanically engaged with a right outer ring gear 1344 (e.g., the first rotary input 1302 drives the right outer ring gear 1344 via the first right spur gear 1342). In some cases, the right outer ring gear 1344 is mechanically engaged with the first right spur gear 1342 via external teeth; in some cases, the right outer ring gear 1344 is mechanically engaged with the first right spur gear 1342 via friction control. The right outer ring gear 1344 is mechanically engaged (e.g., via external teeth or friction control) with a right plurality of planetary gears 1346. A first right rotary input bearing 1348 that is coupled to the first rotary input 1302 is included to support torque forces on the first rotary input 1302.

The right non-fixed planetary gear set 1340 further includes the second right rotary input 1306 coupled to a second right spur gear 1350; the second right spur gear 1350 is mechanically engaged with a right planet gear carrier 1352 (e.g., the second right rotary input 1306 drives the right planet gear carrier 1352 via the second right spur gear 1350). In some cases, the right planet gear carrier 1352 is mechanically engaged with the second right spur gear 1350 via external teeth; in some cases, the right planet gear carrier 1352 is mechanically engaged with the second right spur gear 1350 via friction control. The right planet gear carrier 1352 is coupled to a right plurality of planetary gears 1346; the right plurality of planetary gears 1346 is mechanically engaged (e.g., via external teeth or friction control) with the right outer ring gear 1344 and a right inner sun gear 1356. A second right rotary input bearing 1358 that is coupled to the second right rotary input 1306 is included to support torque multiplication on the second right rotary input 1306.

The right non-fixed planetary gear set 1340 further includes a right rotary output 1360 coupled to the right inner sun gear 1356; the right inner sun gear 1356 is mechanically engaged (e.g., via external teeth or friction control) with the right plurality of planetary gears 1346. As described above, the movement of the right inner sun gear 1356 is dependent on the rotational movement (e.g., RPM) of the right plurality of planetary gears 1346/right planet gear carrier 1352 and the right outer ring gear 1344. One or more right rotary output bearings 1362 that are coupled to the right rotary output 1360 are also included to support torque forces on the right rotary output 1360. This configuration results in a moment offset 1364 (e.g., the vertical distance between the first rotary input 1302/second right rotary input 1306 and the right rotary output 1360) that provides torque multiplication and speed range needed for use in automotive applications.

Figure 14:
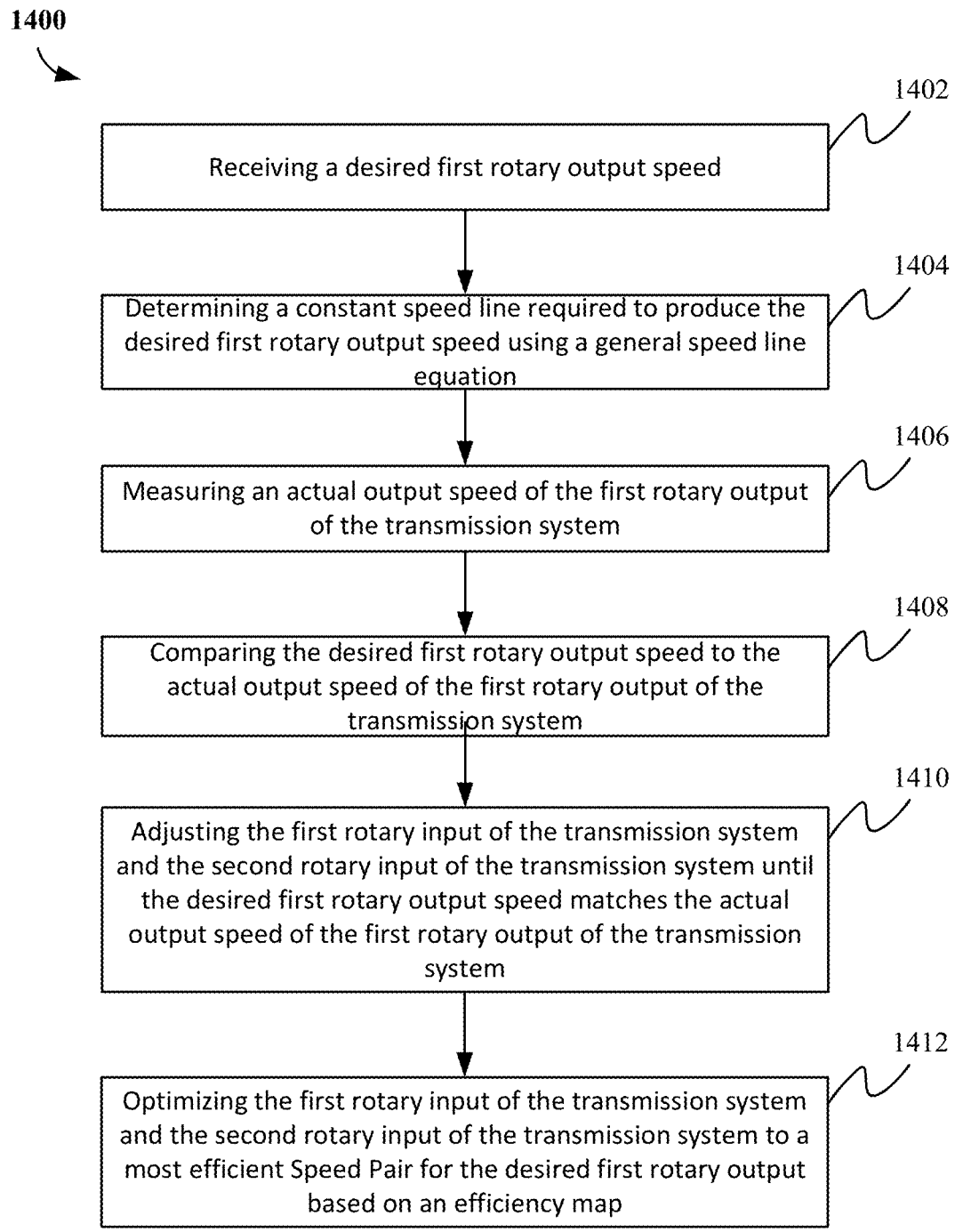
FIG. 14 illustrates a method of controlling a transmission system.

FIG. 14 illustrates a method of controlling a transmission system (e.g., any of the variable electric transmission systems described herein). For example, a transmission system may include a first gear system that includes a first gear, a second gear, and a third gear, wherein the first gear, the second gear, and the third gear are each mechanically engaged with at least one of the other gears. The transmission system may further include a first rotary input coupled to the first gear, a second rotary input coupled to the second gear, and a first rotary output coupled to the third gear.

Referring to FIG. 14, a method 1400 of controlling a variable electric transmission system includes receiving (1402) a desired first rotary output speed, determining (1404) a constant speed line required to produce the desired first rotary output speed using a general speed line equation, measuring (1406) an actual output speed of the first rotary output of the transmission system, comparing (1408) the desired first rotary output speed to the actual output speed of the first rotary output of the transmission system, adjusting (1410) the first rotary input of the transmission system and the second rotary input of the transmission system until the desired first rotary output speed matches the actual output speed of the first rotary output of the transmission system, and optimizing (1412) the first rotary input of the transmission system and the second rotary input of the transmission system to a most efficient Speed Pair for the desired first rotary output based on an efficiency map.

In some cases, the first rotary input of the transmission system is coupled to a first motor and the second rotary input of the transmission system is coupled to a second motor. In some cases, the method 1400 further includes starting the first motor and/or the second motor under zero torque load. In some cases, the method 1400 further includes reducing transmission of motor torque ripple.

In some cases, the transmission system further includes a second gear system that includes a fourth gear; a fifth gear; and a sixth gear, wherein the fourth gear, the fifth gear, and the sixth gear are each mechanically engaged with at least one of the other gears in the second gear system. The transmission system may further include the first rotary input coupled to the fourth gear on an opposing side from the first gear, a third rotary input coupled to the fifth gear, and a second rotary output coupled to the sixth gear.

In some cases, the method 1400 further includes receiving a desired second rotary output speed, determining a constant speed line required to produce the desired second rotary output speed using a general speed line equation, measuring an actual output speed of the second rotary output of the transmission system, comparing the desired second rotary output speed to the actual output speed of the second rotary output of the transmission system, adjusting the third rotary input of the transmission system and the fourth rotary input of the transmission system until the desired second rotary output speed is matches the actual output speed of the second rotary output of the transmission system, and optimizing the third rotary input of the transmission system and the fourth rotary input of the transmission system to a most efficient Speed Pair for the desired second rotary output based on an efficiency map.

In some cases, the method 1400 further includes matching the actual output speed of the first rotary output of the transmission system to the actual speed of the second rotary output of the transmission system for a straight-line driving motion. In some cases, the method 1400 further includes receiving an indication of a left turning motion, and in response to the indication of the left turning motion, decreasing the actual speed of the first rotary output of the transmission system relative to the actual speed of the second rotary output of the transmission system. In some cases, the method 1400 further includes receiving an indication of a right turning motion, and in response to the indication of the right turning motion, increasing the actual speed of the first rotary output of the transmission system relative to the actual speed of the secondary rotary output of the transmission system.

Figure 15:
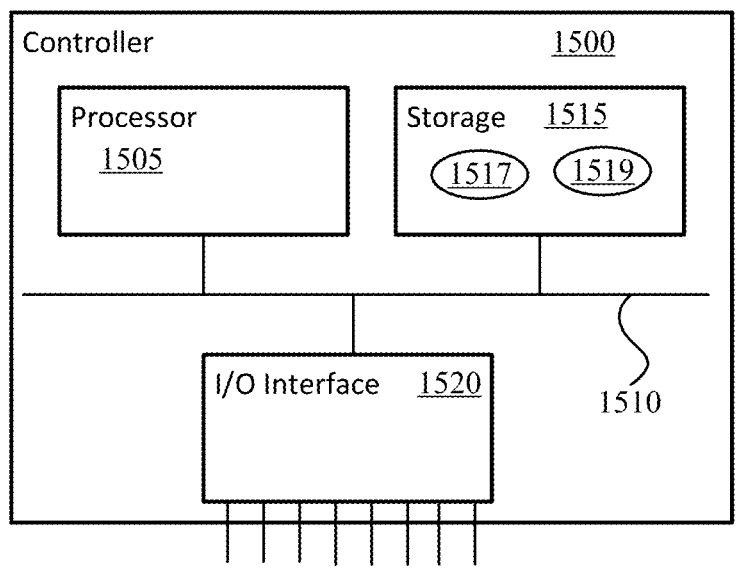
FIG. 15 illustrates a block diagram illustrating components of a controller used in some embodiments.

FIG. 15 illustrates a block diagram illustrating components of a controller used in some embodiments. Referring to FIG. 15, a controller 1500 can include at least one processor 1505 connected to components via a system bus 1510, a storage device 1515 also connected to components of the controller via the system bus 1510, and an input/output ("I/O") interface 1520 connected to the components of the controller via the system bus 1510.

Examples of processor 1505 include general purpose central processing units (CPUs), graphics processing units (GPUs), field programmable gate arrays (FPGAs), application specific processors, and logic devices, as well as any other type of processing device, combinations, or variations thereof.

The storage device 1515 stores instructions 1517 for performing a method of controlling a transmission system (e.g., method 1400 of FIG. 14 and various implementations described above) and one or more efficiency maps 1519 (e.g., efficiency map 600 of FIG. 6). The storage device 1515 includes a system memory (e.g., integrated or removable) and/or a mass storage device. Examples of storage device 1515 include removable and non-removable storage media including, but not limited to, random access memory, read only memory, magnetic disks, optical disks, CDs, DVDs, flash memory, magnetic cassettes, magnetic tape, magnetic disk storage or other magnetic storage devices, or any other suitable storage media. For example, system memory of the storage device 1515 can include random-access memory ("RAM") and/or a read-only memory ("ROM"). The RAM generally provides a local storage and/or cache during processor operations and the ROM generally stores the basic routines that help to transfer information between elements within the computer architecture such as during startup. In no case does storage device 1515 consist of propagating signals or carrier waves.

The I/O interface 1520 connects to elements of the transmission systems described herein, including but not limited to a first rotary input, a second rotary input, a third rotary input, a first rotary output and a second rotary output. The I/O interface 1520 may also be connected to a user interface system that enables communication between a user and the controller 1500. A user interface system can include one or more input devices such as, but not limited to, a touch device for receiving a touch gesture from a user, a motion input device for detecting non-touch gestures and other motions by a user, a microphone for detecting speech, a steering wheel, a joystick, a gas pedal, a brake pedal, and other types of input devices and their associated processing elements capable of receiving user input. The user interface system may also include one or more output devices such as, but not limited to, display screen(s), speakers, haptic devices for tactile feedback, and other types of output devices. In certain cases, the input and output devices may be combined in a single device, such as a touchscreen display which both depicts images and receives touch gesture input from the user.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Certain embodiments of the controller may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

It should be understood that as used herein, in no case do the terms "storage media," "computer-readable storage media" or "computer-readable storage medium" consist of transitory carrier waves or propagating signals. Instead, "storage" media refers to non-transitory media.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

In an implementation, the controller 1500 can conceptually be considered to be a digital to analog converter where digital information (e.g., 100, 150 RPM speed inputs) is converted to an analog signal for processing into an output speed by attempting to reach these speeds.

In an example implementation, a system for setting a drive ratio of a transmission system includes a first gear system including a first gear, a second gear, and a third gear, wherein the first gear, the second gear, and the third gear are each mechanically engaged with at least one of the other gears of the first gear system. The system further includes a first rotary input coupled to the first gear, a second rotary input coupled to the second gear, and a first rotary output coupled to the third gear, wherein the first gear system is configured to achieve a moment offset to support torque forces on the first rotary input, the second rotary input, and the first rotary output.

The transmission systems described herein fully decouple the rotation of the input motors and resulting output. This permits several advantages to the motors. First, the motors can start under zero load, thus motors without high starting torques can be applied. Second, only one motor in the system must be self-starting. Once one motor is rotating, the combined gear set will induce rotation in all additional motors, permitting a starting function. Third, decoupling reduces the motor torque ripple by two methods; first, it permits the motor to operate at higher rotational speeds, where inertial properties reduce torque ripple and second, the decoupled mechanical connections damp the transmission of torque ripple. Finally, as decoupling permits the motor to operate in a limited range of rotational speed and still provides a full range of output speeds, the motor can be designed for optimum efficiently in this limited speed range.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for setting a drive ratio of a transmission comprising:
    a first gear system comprising:
        a first gear;
        a second gear; and
        a third gear, wherein the first gear, the second gear, and the third gear are each mechanically engaged with at least one of the other gears of the first gear system;
    a first rotary input coupled to the first gear;
    a second rotary input coupled to the second gear;
    a first rotary output coupled to the third gear;
    a second gear system comprising:
        a fourth gear;
        a fifth gear; and
        a sixth gear, wherein the fourth gear, the fifth gear, and the sixth gear are each mechanically engaged with at least one of the other gears of the second gear system;
    the first rotary input further coupled to the fourth gear on an opposing side from the first gear;
    a third rotary input coupled to the fifth gear; and
    a second rotary output coupled to the sixth gear,
    wherein during operation a speed of the first rotary output is independent of a speed of the second rotary output.

2. The system of claim 1, further comprising a first spur gear and a second spur gear, wherein the first rotary input is coupled to the first gear via the first spur gear and the second rotary input is coupled to the second gear via the second spur gear.

3. The system of claim 2, further comprising a first rotary input bearing coupled to the first rotary input and a second rotary input bearing coupled to the second rotary input.

4. The system of claim 3, further comprising one or more rotary output bearings coupled to the first rotary output.

5. The system of claim 4, wherein the first rotary input bearing and the second rotary input bearing are not coaxial with the first rotary output bearing.

6. The system of claim 5, wherein the first rotary input bearing, the second rotary input bearing, and the first rotary output bearing are coupled to transmission mounts.

7. The system of claim 1, wherein during operation, the first rotary input moves the first gear at a same peripheral speed as the second rotary input moves the second gear for a neutral operation of the first rotary output via the third gear.

8. The system of claim 1, wherein during operation, the first rotary input moves the first gear at a faster peripheral speed as the second rotary input moves the second gear for a forward operation of the first rotary output via the third gear.

9. The system of claim 1, wherein during operation, the first rotary input moves the first gear at a slower peripheral speed as the second rotary input moves the second gear for a reverse operation of the first rotary output via the third gear.

10. The system of claim 1, wherein the first gear is an outer ring gear, the second gear is an inner sun gear, and the third gear is a plurality of planetary gears.

11. The system of claim 1, wherein the first gear is an outer ring gear, the second gear is an inner sun gear, and the third gear is an eccentric gear.

12. The system of claim 11, further comprising a double-eccentric gear engaging the outer ring gear and the inner sun gear, wherein the eccentric gear is coupled to the double-eccentric gear.

13. The system of claim 12, wherein a base diameter of the outer ring gear and the inner sun gear are equal, wherein the double-eccentric gear is conical shaped to accommodate the equal base diameter of the outer ring gear and the inner sun gear.

14. The system of claim 12, further comprising gear teeth on each of the outer ring gear, the inner sun gear, and the double-eccentric gear.

15. The system of claim 12, further comprising friction control on each of the outer ring gear, the inner sun gear, and the double-eccentric gear.

16. The system of claim 1, wherein during operation, movement of the first rotary input and the second rotary input are simultaneously adjusted until a desired output speed is reached.

17. The system of claim 1, wherein during operation, transmission of power is reversed to provide a braking force to the first rotary output or energy recovery to a power source.

18. A method of controlling a transmission system, the transmission system comprising a first gear system that includes a first gear, a second gear, and a third gear, wherein the first gear, the second gear, and the third gear are each mechanically engaged with at least one of the other gears in the first gear system; a first rotary input coupled to the first gear; a second rotary input coupled to the second gear; and a first rotary output coupled to the third gear, a second gear system that includes a fourth gear; a fifth gear; and a sixth gear, wherein the fourth gear, the fifth gear, and the sixth gear are each mechanically engaged with at least one of the other gears in the second gear system; the first rotary input coupled to the fourth gear on an opposing side from the first gear; a third rotary input coupled to the fifth gear; and a second rotary output coupled to the sixth gear, wherein during operation a speed of the first rotary output is independent of a speed of the second rotary output, the method comprising:
    receiving a desired first rotary output speed;
    determining a constant speed line required to produce the desired first rotary output speed using a general speed line equation;
    measuring an actual output speed of the first rotary output of the transmission system;
    comparing the desired first rotary output speed to the actual output speed of the first rotary output of the transmission system;

adjusting the first rotary input of the transmission system and the second rotary input of the transmission system until the desired first rotary output speed matches the actual output speed of the first rotary output of the transmission system; and optimizing the first rotary input of the transmission system and the second rotary input of the transmission system to a most efficient Speed Pair for the desired first rotary output based on an efficiency map.

19. The method of claim 18, further comprising:

receiving a desired second rotary output speed;

determining a constant speed line required to produce the desired second rotary output speed using a general speed line equation;

measuring an actual output speed of the second rotary output of the transmission system;

comparing the desired second rotary output speed to the actual output speed of the second rotary output of the transmission system;

adjusting the third rotary input of the transmission system and the fourth rotary input of the transmission system until the desired second rotary output speed matches the actual output speed of the second rotary output of the transmission system; and optimizing the third rotary input of the transmission system and the fourth rotary input of the transmission system to a most efficient Speed Pair for the desired second rotary output based on an efficiency map.

20. The method of claim 19, further comprising matching the actual output speed of the first rotary output of the transmission system to the actual speed of the second rotary output of the transmission system for a straight-line driving motion.

21. The method of claim 19, further comprising:

receiving an indication of a left turning motion; and in response to the indication of the left turning motion, decreasing the actual speed of the first rotary output of the transmission system relative to the actual speed of the second rotary output of the transmission system.

22. The method of claim 19, further comprising:

receiving an indication of a right turning motion; and in response to the indication of the right turning motion, increasing the actual speed of the first rotary output of the transmission system relative to the actual speed of the second rotary output of the transmission system.

23. The method of claim 18, wherein the first rotary input of the transmission system is coupled to a first motor and the second rotary input of the transmission system is coupled to a second motor, the method further comprising starting the first motor or the second motor under zero torque load.

24. The method of claim 18, further comprising reducing transmission of motor torque ripple.

25. A conjoined system for setting a drive ratio of a transmission comprising:

a left gear system;

a right gear system;

a first rotary input coupled to the left gear system and the right gear system;

a second left rotary input coupled to the left gear system;

a second right rotary input coupled to the right gear system;

a left rotary output coupled to the left gear system; and a right rotary output coupled to the right gear system, wherein during operation a speed of the left rotary output is independent of a speed of the right rotary output.

26. A system for setting a drive ratio of a transmission system comprising:

a first gear system comprising:

a first gear;

a second gear; and a third gear, wherein the first gear, the second gear, and the third gear are each mechanically engaged with at least one of the other gears of the first gear system;

a first rotary input coupled to the first gear;

a second rotary input coupled to the second gear;

a first rotary output coupled to the third gear, wherein the first gear system is configured to achieve a moment offset to support torque forces on the first rotary input, the second rotary input, and the first rotary output;

a second gear system comprising:

a fourth gear;

a fifth gear; and a sixth gear, wherein the fourth gear, the fifth gear, and the sixth gear are each mechanically engaged with at least one of the other gears of the second gear system;

the first rotary input further coupled to the fourth gear on an opposing side from the first gear;

a third rotary input coupled to the fifth gear; and a second rotary output coupled to the sixth gear, wherein the second gear system is configured to achieve a moment offset to support torque forces on the first rotary input, the third rotary input, and the second rotary output, wherein during operation a speed of the first rotary output is independent of a speed of the second rotary output.

* * * * *